United States Patent
Kwon

(10) Patent No.: US 11,667,013 B2
(45) Date of Patent: Jun. 6, 2023

(54) MANUAL HYDRAULIC MULTI-FUNCTIONAL EXTRA-HIGH-VOLTAGE INSULATING GEAR GRIPPER PLIERS STICK FOR LIVE-WIRE WORK AND INDIRECT LIVE-WIRE CONSTRUCTION METHOD USING PLIERS STICK

(71) Applicants: DAEWON ELECTRIC CO.,LTD., Chungcheongbuk-do (KR); DAEWON INDUSTRY COMPANY, Chungcheongbuk-do (KR)

(72) Inventor: Sae Won Kwon, Chungcheongbuk-do (KR)

(73) Assignees: DAEWON ELECTRIC CO., LTD., Chungcheongbuk-do (KR); DAEWON INDUSTRY COMPANY, Chungcheongbuk-do (KR)

( * ) Notice: Subject to any disclaimer, the term of this patent is extended or adjusted under 35 U.S.C. 154(b) by 635 days.

(21) Appl. No.: 16/642,175

(22) PCT Filed: Aug. 30, 2018

(86) PCT No.: PCT/KR2018/010014
§ 371 (c)(1),
(2) Date: Feb. 26, 2020

(87) PCT Pub. No.: WO2019/045458
PCT Pub. Date: Mar. 7, 2019

(65) Prior Publication Data
US 2021/0069870 A1    Mar. 11, 2021

(30) Foreign Application Priority Data
Sep. 1, 2017   (KR) .................. 10-2017-0111780

(51) Int. Cl.
B25B 7/12    (2006.01)
B25B 7/02    (2006.01)
(Continued)

(52) U.S. Cl.
CPC ............... *B25B 7/126* (2013.01); *B25B 7/02* (2013.01); *B25B 7/08* (2013.01); *H02G 1/02* (2013.01)

(58) Field of Classification Search
CPC .. B25B 7/00; B25B 7/08; B25B 7/126; B25B 9/00
(Continued)

(56) References Cited
U.S. PATENT DOCUMENTS
2005/0103170 A1*  5/2005  Del Rio ................... B26D 5/12
                                                                81/301

FOREIGN PATENT DOCUMENTS
JP      05-050921 U     7/1993
JP      5111174 B2      12/2012
(Continued)

*Primary Examiner* — David B. Thomas
*Assistant Examiner* — Aaron R McConnell
(74) *Attorney, Agent, or Firm* — NKL Law; Jae Youn Kim

(57) ABSTRACT

The present invention relates to a manual hydraulic multi-functional extra-high-voltage insulating gear gripper pliers stick for live-wire work and the pliers stick and, more specifically, to a manual hydraulic multi-functional extra-high-voltage insulating gear gripper pliers stick for live-wire work and an indirect live-wire construction method using the pliers stick, which: allow components or the like, which are installed on and removed from an electric pole in order to perform electric wire-stringing work or fix electric wires, to be remotely constructed by means of the indirect live-wire work while maintaining a safe distance from live wires when constructing power distribution equipment in an extra-high-
(Continued)

voltage live-wire state; ensure safety by eliminating risks due to instability during work, said instability occurring due to the intensity of the labor and the physical limitations of the workers; and bring about improvements in utilization efficiency.

12 Claims, 18 Drawing Sheets

(51) Int. Cl.
    *B25B 7/08*     (2006.01)
    *H02G 1/02*     (2006.01)

(58) Field of Classification Search
    USPC .............. 7/107; 91/415, 416, 417 A, 417 R; 81/53.1, 376, 423, 426.5
    See application file for complete search history.

(56) References Cited

FOREIGN PATENT DOCUMENTS

| | | | |
|---|---|---|---|
| JP | 2014-143772 | A | 8/2014 |
| JP | 2017-028925 | A | 2/2017 |
| KR | 20-0378195 | Y1 | 3/2005 |
| KR | 10-2011-0011408 | A | 2/2011 |
| KR | 10-1693146 | B1 | 1/2017 |

* cited by examiner

MANUAL HYDRAULIC MULTI-FUNCTIONAL EXTRA-HIGH-VOLTAGE INSULATING GEAR GRIPPER PLIERS STICK FOR LIVE-WIRE WORK AND INDIRECT LIVE-WIRE CONSTRUCTION METHOD USING PLIERS STICK

TECHNICAL FIELD

The present invention relates to an insulating gear gripper pliers stick for enabling long-distance indirect live-wire construction in the state of assuring a safe separation distance from a live wire when mounting or removing equipment (pole fittings) to or from an electric pole in order to perform wiring or to fix or remove an electric wire during power distribution construction in the presence of a live high-voltage wire, and more particularly to a manual hydraulic multi-functional extra-high-voltage insulating gear gripper pliers stick for live-wire work and an indirect live-wire construction method using the pliers stick, which enable various kinds of construction by providing strong force for gripping or spreading an electric wire or equipment in the state of assuring a sufficient distance from an extra-high-voltage electric wire, and which facilitates indirect live-wire work and assures the safety of a worker by reducing the weight of the distal end of an insulated stick by mounting a hydraulic operation unit to a handle operation unit of the insulated stick.

BACKGROUND ART

With the rapid increase in the demand for electric power, electric power facilities have expanded corresponding thereto. As the level of quality of electricity required by electric power users increases, users are increasingly likely to file civil complaints even for momentary blackouts and to take group actions or legal actions such as damage claims. In order to provide high-quality electric power supply service, a non-interrupting power distribution construction method is performed without interrupting the supply of electric power (in the live-wire state).

Conventionally, the non-interrupting live-wire construction described above is implemented through direct live-wire work or manual indirect live-wire work. However, the conventional direct live-wire work or manual indirect work has problems in that the scope of application thereof is limited, the degree of risk is high, it is difficult to perform the same, and the work is time-consuming.

In this regard, various types of equipment have recently been developed. In particular, Korean Patent Registration No. 10-1693146, filed by the applicant of the present invention, discloses a wire stripper, which enables a worker wearing insulating equipment to easily approach an electric wire using a live-wire bucket truck and to directly perform live-wire work while contacting a live electric wire, thereby increasing the range of possible work, reducing working time, and greatly improving working efficiency compared to indirect work.

However, since the work is performed in direct contact with live electric wire or at a distance very close thereto, there are problems in that accidents attributable to human error frequently occur, and it is demanded to eliminate or reduce the amount of non-interrupting live-wire work.

In order to solve the above-described problems, the applicant of the present invention has proposed a semiautomatic extra-high-voltage insulating wire stripper and an indirect live-wire stripping method using the wire stripper, which uses rotation of a gear rotation rod, which is formed in an insulating stick type and is configured such that a wire-sheath cutting holder having a cutter detachably embedded therein is mounted in a casing having an opening/closing hole for fixing a stripped live wire so as to enable indirect live-wire stripping work in the state of assuring a safe distance from the live wire.

However, although the work is performed using the above-described wire stripper, it requires a variety of processes, for example, gripping, fixing, removing, cutting, and spreading of a live wire or equipment, in order to mount or remove the same to and from an electric pole, and a worker inevitably needs to wear insulating equipment and to take the risk of directly contacting the electric wire in order to securely grip and fix the live wire or equipment. The conventional labor-dependent indirect live-wire construction apparatus has serious problems in that the grasping force thereof is small, in that it is impossible to perform various kinds of difficult work using the same, and in that the consumption of labor is high, whereby accidents frequently occur due to mistakes or physical limits of a worker during continuous work.

RELATED ART DOCUMENTS

Patent Documents

Korean Patent Registration No. 10-1693146

DISCLOSURE

Technical Problem

The present invention has been made in view of the above problems, and it is an object of the present invention to provide a manual hydraulic multi-functional extra-high-voltage insulating gear gripper pliers stick for live-wire work and an indirect live-wire construction method using the pliers stick, in which a gear gripper is formed at the distal end of an insulated extension stick, and a hydraulic operation unit for operating the gripper through formation or interruption of the flow of hydraulic pressure and a hydraulic lever for operating a hydraulic pumping unit are formed at a handle operation unit formed at the rear end portion of the insulated extension stick, thereby enabling the operation of the gear gripper at a distance far from a live wire in the state of assuring a safe separation distance for live-wire work, enabling indirect live-wire work in the state of assuring a safe separation distance from a live wire without requiring a worker to take the risk of approaching the live wire when mounting or removing equipment (pole fittings) to or from an electric pole in order to perform wiring or to fix an electric wire during power distribution construction in the presence of a live extra-high-voltage wire by easily providing strong force for gripping or spreading an extra-high-voltage electric wire or equipment through the operation of the hydraulic lever even at a distance far from the live wire, and eliminating the risk of accidents attributable to strenuous tasks or the physical limits of a worker during work and assuring safety by reducing the weight of the distal end of the insulated stick by mounting the hydraulic operation unit to the handle operation unit of the insulated stick.

In addition, it is another object of the present invention to provide a manual hydraulic multi-functional extra-high-voltage insulating gear gripper pliers stick for live-wire work and an indirect live-wire construction method using the pliers stick, in which various types of tools are replaceably mounted to pliers mounting brackets of the gripper, thereby enabling various kinds of work using strong gripping force or spreading force in the presence of a live extra-high-voltage wire, and consequently improving the use efficiency thereof.

Technical Solution

In order to accomplish the above objects, there is provided a manual hydraulic multi-functional extra-high-voltage insulating gear gripper pliers stick for live-wire work including:

a handle operation unit configured to control hydraulic pressure;

an extension stick in which an operation bar is provided so as to be coupled at a rear end thereof to a distal end of a cylinder rod and to protrude forwards, the extension stick being coupled at a rear end thereof to a cylinder unit while surrounding the cylinder unit, and protruding forwards; and a gear gripper unit configured to be folded and unfolded by operation of hydraulic pressure of the handle operation unit, wherein the handle operation unit includes:

an oil tank in which oil is charged, the oil tank including an oil outlet formed at a distal end thereof and an outer portion covered with a handle;

a pumping unit connected to the oil tank to allow or interrupt of flow of oil, the pumping unit including a first unfolding flow path and a first folding flow path formed therein to allow oil to flow therethrough;

a fixed block connected to a distal end of the pumping unit, the fixed block including a second unfolding flow path and a second folding flow path formed therein so as to be connected to the first unfolding flow path and the first folding flow path; and the cylinder unit connected to a distal end of the fixed block, the cylinder unit including a third unfolding flow path formed therein so as to be connected to the second unfolding flow path and a third folding flow path formed therein so as to be connected to the second folding flow path, the cylinder rod being formed at a distal end of the cylinder unit so as to be slidable, and wherein the gear gripper unit includes:

a grip holder formed at a front portion of the insulated extension stick, the grip holder including a sliding bar formed through a center portion thereof, the sliding bar including a rack gear formed in a front portion thereof, the sliding bar being coupled at a rear portion thereof to a distal end of the operation bar, the grip holder including a pair of mounting bracket operation recesses formed in opposite sides of a front portion thereof;

a pair of pliers mounting brackets, a rear portion of each of which is inserted into and pivotably mounted to a respective one of the mounting bracket operation recesses, each of the pliers mounting brackets including a pinion gear formed in a circumferential portion of the pivotably mounted rear portion thereof so as to be threadedly engaged with the rack gear, the pliers mounting brackets being configured to be unfolded or folded by sliding movement of the cylinder rod; and pliers mounted to the pliers mounting brackets and configured to be unfolded and folded together with the pliers mounting brackets.

Using the manual hydraulic multi-functional extra-high-voltage insulating gear gripper pliers stick for live-wire work, during power distribution construction in presence of a live high-voltage wire, a worker may assure a safe separation distance from a power distribution line using the insulated extension stick, and may perform any one indirect live-wire work selected from among work of gripping a wire, work of spreading, peeling off, or putting on a sleeve cover or a dead-end cover enveloping a dead-end clamp, work of cutting a bind wire, a sheath, or a wire, work of gripping a small part, and work of gripping a connection pin (a cotter pin) used to connect a suspension insulator through hydraulic pumping operation using the handle operation unit and operation of the pliers.

Advantageous Effects

As described above, the manual hydraulic multi-functional extra-high-voltage insulating gear gripper pliers stick for live-wire work and the indirect live-wire construction method using the pliers stick may exhibit effects of enabling indirect live-wire work in the state of assuring a safe separation distance from a live wire without requiring a worker to take the risk of approaching the live wire when mounting or removing equipment (pole fittings) to or from an electric pole in order to perform wiring or to fix an electric wire during power distribution construction in the presence of a live extra-high-voltage wire by reducing the weight of the distal end of the insulated stick by mounting the hydraulic operation unit to the handle operation unit of the insulated stick and by easily providing strong force for gripping, handling or mounting an extra-high-voltage electric wire or equipment through the operation of the hydraulic lever even at a distance far from the live wire, and consequently enabling safe work and further improving working efficiency by solving problems associated with strenuous tasks or the physical limits of a worker.

In addition, since various types of pliers are replaceably mounted to the pliers mounting brackets of the gripper, it is possible to exhibit effects of enabling various kinds of indirect live-wire work using strong gripping force or spreading force during power distribution construction in the presence of a live extra-high-voltage wire, consequently further improving use efficiency.

DESCRIPTION OF REFERENCE NUMERALS

Figure 1:
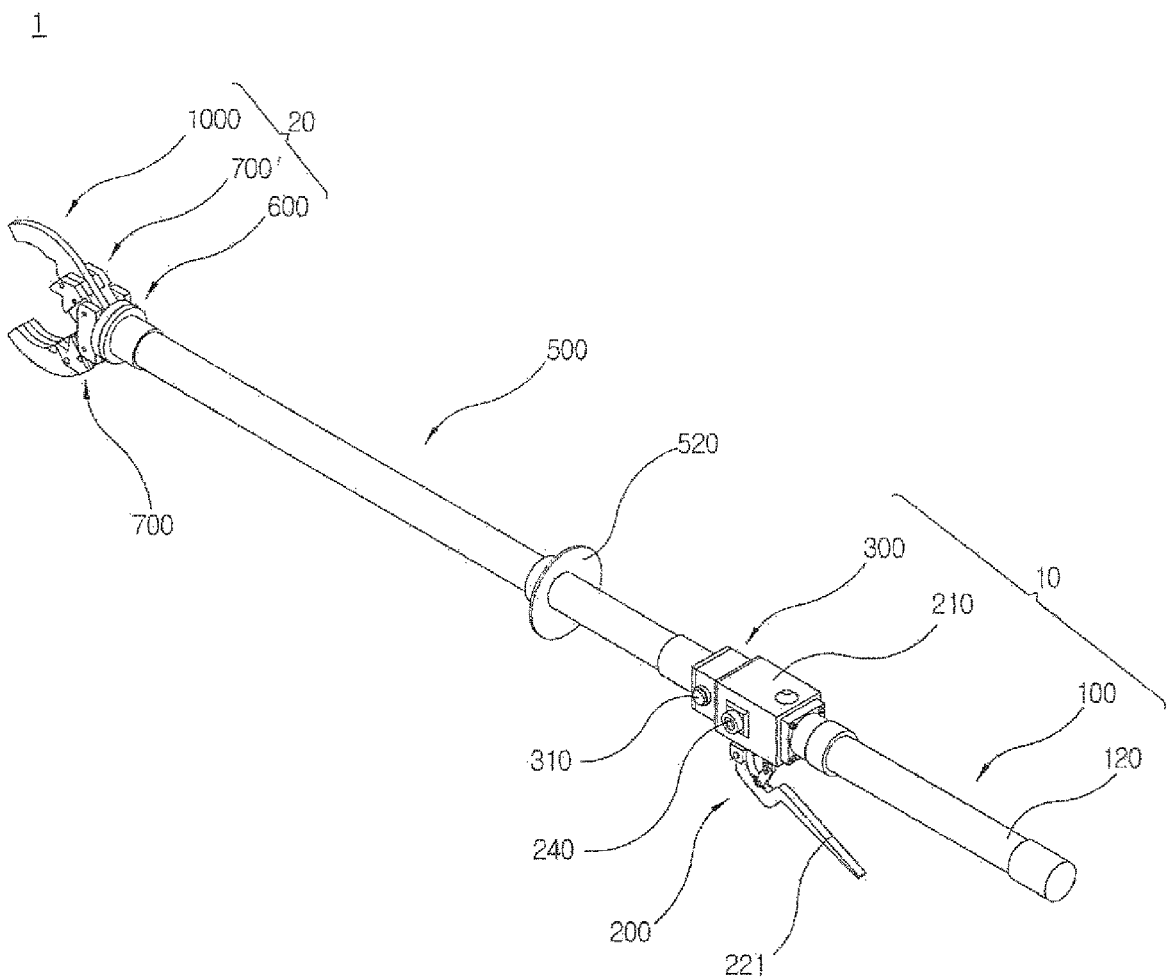
FIG. 1 is a perspective view of a manual hydraulic multi-functional extra-high-voltage insulating gear gripper pliers stick for live-wire work according to the present invention.

10: handle operation unit, 20: gear gripper unit
50: electric wire
100: oil tank, 110: oil outlet
120: handle
200: pumping unit, 201: first unfolding flow path
202: first folding flow path, 210: body
220: pressure chamber, 221: hydraulic lever
222: spring, 223: piston
230: branch chamber, 231: connection flow path
232: one-way check valve, 240: directional control valve
241: first flow path, 242: second flow path
300: fixed block, 301: second unfolding flow path
302: second folding flow path, 310: bidirectional check valve
311: valve chamber, 321: unfolding valve unit
321a: unfolding oil chamber, 322: unfolding valve
325: folding valve unit, 325a: folding oil chamber
326: folding valve, 218: valve piston
331,331': closing cap, 335: valve piston
336: unfolding flow path communication portion, 336a: inclined surface
337: folding flow path communication portion, 337a: inclined surface
400: cylinder unit, 401: third unfolding flow path
402: third folding flow path, 410: cylinder body
411: piston chamber, 420: guide pipe
421: through-hole, 430: cylinder rod
431: cylinder piston, 432: guide groove
433: flow path communication hole, 440: closing cap
441: oil groove
500: insulated extension stick, 510: operation bar
520: handle safe-distance portion
600: grip holder, 610: sliding bar
611: rack gear, 620,620': mounting bracket operation recess
700,700': pliers mounting bracket, 710: pinion gear
1000: pliers, 1100: gripper pliers
1001,1001': folding bar
1110,1110': gripping recess, 1111,1111': wire-seating recess
1200: snap pliers, 1210: spreading portion
1300: nipper pliers, 1310: cutting portion
1400: long nose pliers, 1410: pincer portion
1500: pin-gripping pliers, 1510: pin-gripping recess

BEST MODE

It is to be understood that the phraseology and terminology used in the following specification and appended claims should not be construed as being limited to general and dictionary meanings but should be construed as having meanings and concepts according to the spirit of the present invention on the basis of the principle that the inventor is permitted to define appropriate terms for the best explanation.

The embodiments described in the following specification and shown in the accompanying drawings are illustrative only and are not intended to represent all aspects of the invention, and thus it is to be understood that various equivalents and modifications can be made without departing from the spirit of the invention.

Hereinafter, preferred embodiments of the present invention will be described in detail with reference to the accompanying drawings.

Figure 2:
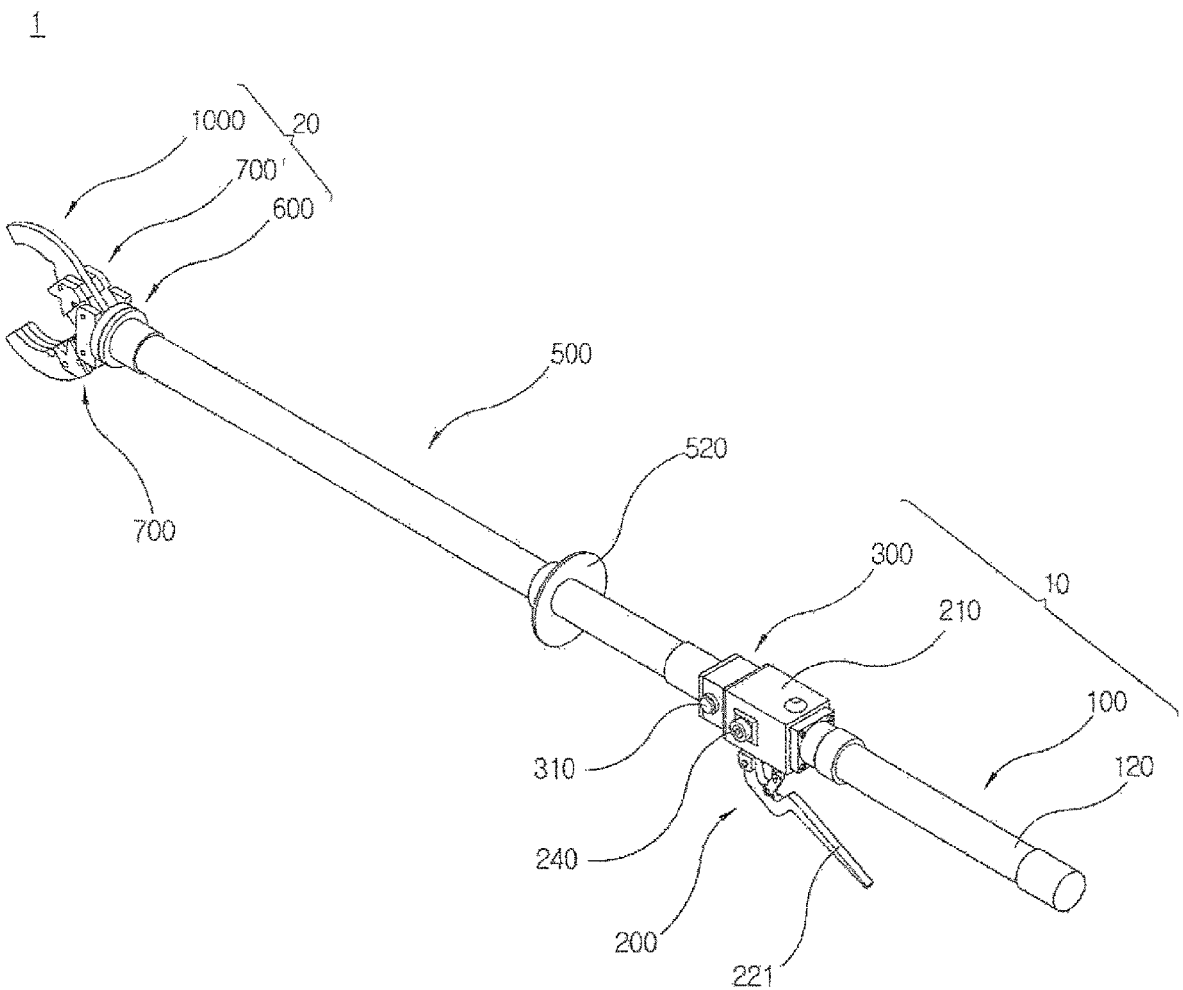
FIG. 2 is a side cross-sectional view of the manual hydraulic multi-functional extra-high-voltage insulating gear gripper pliers stick for live-wire work according to the present invention.
Figure 3:
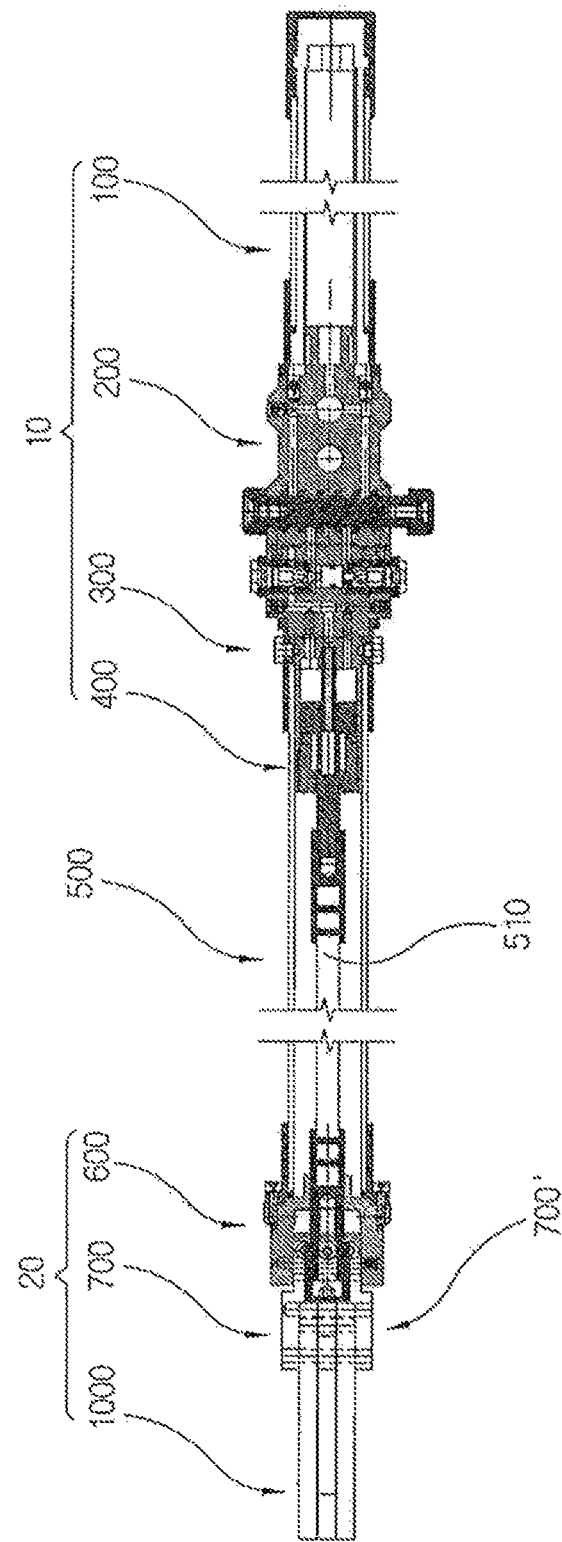
FIG. 3 is a plan cross-sectional view of the manual hydraulic multi-functional extra-high-voltage insulating gear gripper pliers stick for live-wire work according to the present invention.

FIG. 1 is a perspective view of a manual hydraulic multi-functional extra-high-voltage insulating gear gripper pliers stick for live-wire work according to the present invention, FIG. 2 is a side cross-sectional view of the manual hydraulic multi-functional extra-high-voltage insulating gear gripper pliers stick for live-wire work according to the present invention, and FIG. 3 is a plan cross-sectional view of the manual hydraulic multi-functional extra-high-voltage insulating gear gripper pliers stick for live-wire work according to the present invention.

As shown in FIGS. 1 to 3, the manual hydraulic multi-functional extra-high-voltage insulating gear gripper pliers stick 1 for live-wire work according to the present invention includes a handle operation unit 10, an insulated extension stick 500, and a gear gripper unit 20.

First, the handle operation unit 10 is configured to enable control of hydraulic pressure in the operation of the manual hydraulic multi-functional extra-high-voltage insulating gear gripper pliers stick 1 for live-wire work according to the present invention, and includes an oil tank 100, a pumping unit 200, a fixed block 300, and a cylinder unit 400.

Here, the oil tank 100 is filled with oil, and has an oil outlet 110 formed in the distal end thereof to allow the oil charged therein to be discharged.

Further, the oil tank 100 is configured such that the outer circumferential portion thereof is covered with a handle 120 to enable a user to grip the rear portion thereof.

Figure 4:
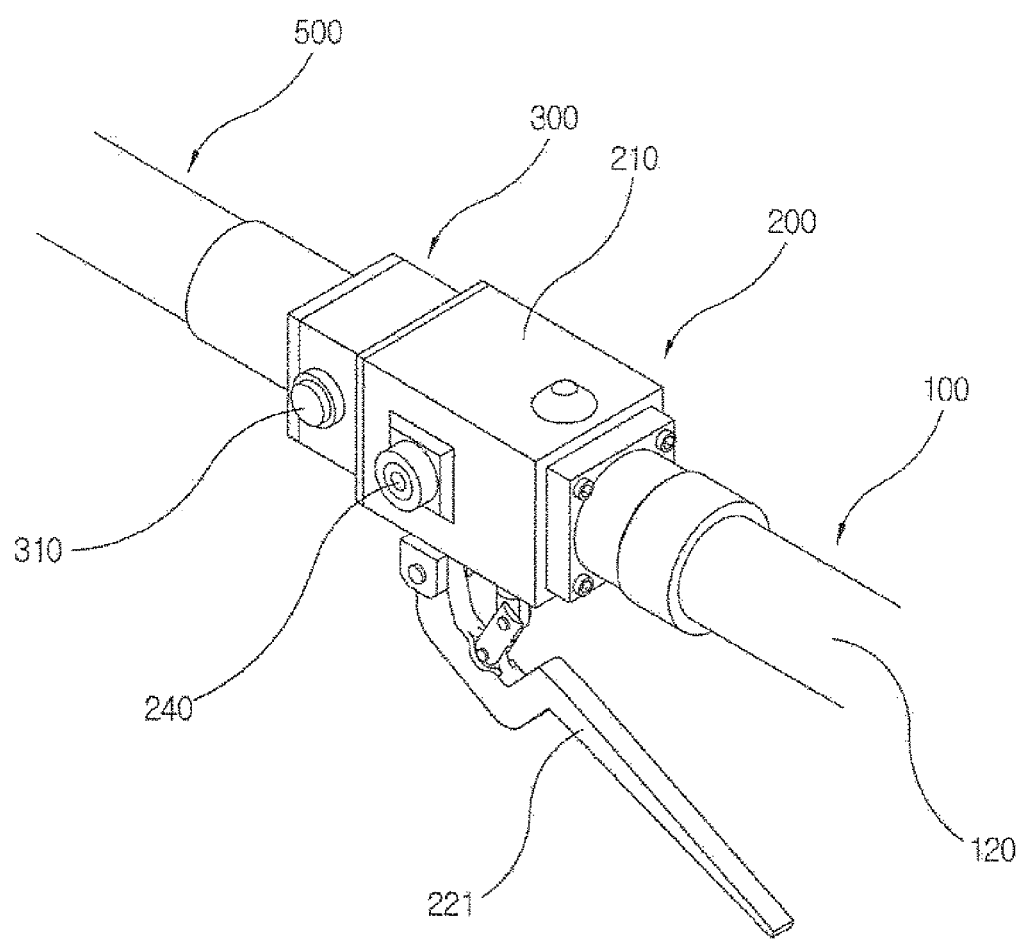
FIG. 4 is a perspective view of main components disposed at the rear portion of the manual hydraulic multi-functional extra-high-voltage insulating gear gripper pliers stick for live-wire work according to the present invention.
Figure 5:
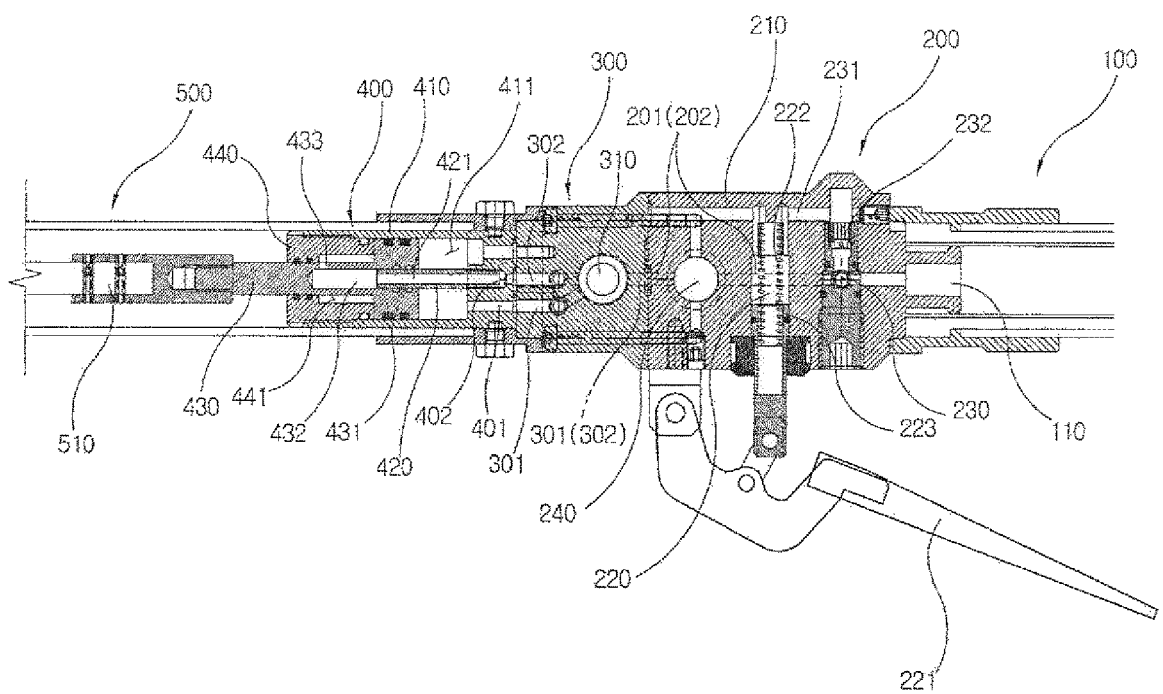
FIG. 5 is a side cross-sectional view of main components disposed at the rear portion of the manual hydraulic multi-functional extra-high-voltage insulating gear gripper pliers stick for live-wire work according to the present invention.
Figure 6:
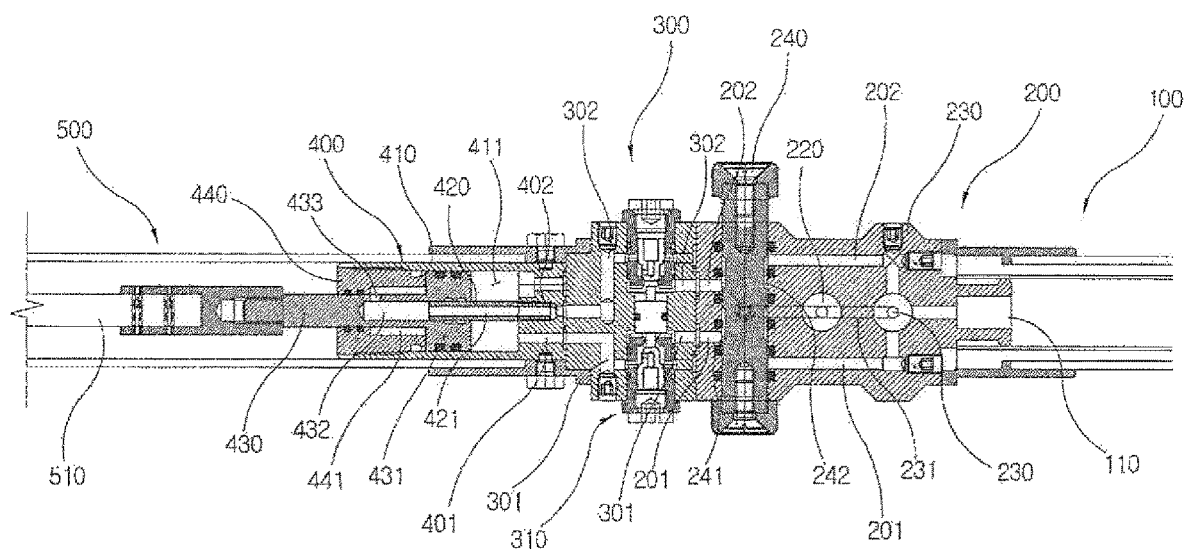
FIG. 6 is a plan cross-sectional view of main components disposed at the rear portion of the manual hydraulic multi-functional extra-high-voltage insulating gear gripper pliers stick for live-wire work according to the present invention.

The pumping unit 200 is connected to the oil tank 100 to regulate the discharge of oil from the oil tank 100 and the circulation of oil, and as shown in FIGS. 4 to 6, includes a block-shaped body 210, which is connected to the oil tank 100.

In this case, a pressure chamber 220 for pressurizing the oil is formed in the body 210. The pressure chamber 220 is formed vertically in the drawing, and a piston 223, around which a spring 222 is elastically mounted, is provided in the pressure chamber 220. The piston 223 is pumped by the pumping operation of a hydraulic lever 221, which is provided outside the body 210, and applies pressure to the pressure chamber 220.

In addition, a branch chamber 230 is formed in the body 210. In this case, the branch chamber 230 is disposed in the same row as the pressure chamber 220 at a position behind and adjacent to the pressure chamber 220, and is connected to the pressure chamber 220 via a connection flow path 231 formed below the same.

Further, the branch chamber 230 is connected to the oil outlet 110 of the oil tank 100, and a first unfolding flow path 201 and a first folding flow path 202, which diverge in a "[" shape when viewed in plan, are formed at a connection portion between the branch chamber 230 and the oil outlet 110. The first unfolding flow path 201 and the first folding flow path 202 are configured such that the distal ends thereof are open toward the distal end of the body 210.

In addition, a one-way check valve 232, which is closed when pressure is applied thereto from the pressure chamber 220 and is opened when the pressure from the pressure chamber 220 is released, is disposed in the portion of the branch chamber 230 that is connected to the connection flow path 231. In this case, the one-way check valve 232 may be formed in a commonly used configuration, which includes a valve head, a spring, and a ball (not shown in the drawings), rather than being formed in a new configuration. When pressure is applied thereto, the ball is moved against the force of the spring to close the pressure chamber 220, and when the pressure is released, the ball is moved by the force of the spring to open the pressure chamber and enable the flow of oil through the valve head.

In addition, a directional control valve 240 is disposed in the body 210. In this case, the directional control valve 240 is disposed so as to penetrate the body 210 in a horizontal direction and in a direction perpendicular to the pressure chamber 220 between opposite side surfaces of the body 210, and is configured to operate by reciprocating.

In this case, the directional control valve 240 penetrates the middle portions of the first unfolding flow path 201 and the first folding flow path 202, which diverge from each other, to divide each of the first unfolding flow path 201 and the first folding flow path 202 into a front part and a rear part. The circumferential portion of the directional control valve 240 is connected to the pressure chamber 220 via the connection flow path 231 so that the oil is capable of being discharged through the first unfolding flow path 201 or the first folding flow path 202.

In addition, the directional control valve 240 includes first and second flow paths 241 and 242, which are formed in a circular shape and are disposed in two rows in the circumferential portion thereof. During the reciprocating operation of the directional control valve 240, the first and second flow paths 241 and 242 are selectively connected to the connection flow path 231, and selectively interfere with the first unfolding flow path 201 or the first folding flow path 202.

That is, during the reciprocating operation of the directional control valve 240, when the first flow path 241 is connected to the connection flow path 231, the directional control valve 240 is connected to the first unfolding flow path 201, whereby, when pressure is generated in the pressure chamber 220, the oil is supplied forwards through the front part of the first unfolding flow path 201 via the connection flow path 231 and the first flow path 241. When the second flow path 242 is connected to the connection flow path 231, the directional control valve 240 is connected to the first folding flow path 202, whereby, when pressure is generated in the pressure chamber 220, the oil is supplied through the front part of the first unfolding flow path 201 via the connection flow path 231 and the second flow path 242.

The fixed block 300 is formed in a block shape, and is connected to the distal end of the body 210 of the pumping unit 200. A second unfolding flow path 301 and a second folding flow path 302, which are connected to the front part of the first unfolding flow path 201 and the front part of the first folding flow path 202, are formed in the fixed block 300.

In addition, a valve chamber 311 is formed in the fixed block 300 so as to penetrate the fixed block 300 and to divide each of the second unfolding flow path 301 and the second folding flow path 302 into a front part and a rear part. In this case, a bidirectional check valve 310 is disposed in the valve chamber 311 in order to connect the separated parts of the second unfolding flow path 301 to each other or to connect the separated parts of the second folding flow path 302 to each other according to the direction of the hydraulic pressure applied to the second unfolding flow path 301 or the second folding flow path 302.

Meanwhile, the directionality of each of the second unfolding flow path 301 and the second folding flow path 302, which are divided by the valve chamber 311, is not particularly limited. Each of the second unfolding flow path 301 and the second folding flow path 302 may be divided into parts that are arranged in the same line, may be divided into parts that are arranged in different lines, or may be configured to form a bypass structure.

In this case, the bidirectional check valve 310 is not particularly limited, but may be embodied in any of various configurations.

Figure 7:
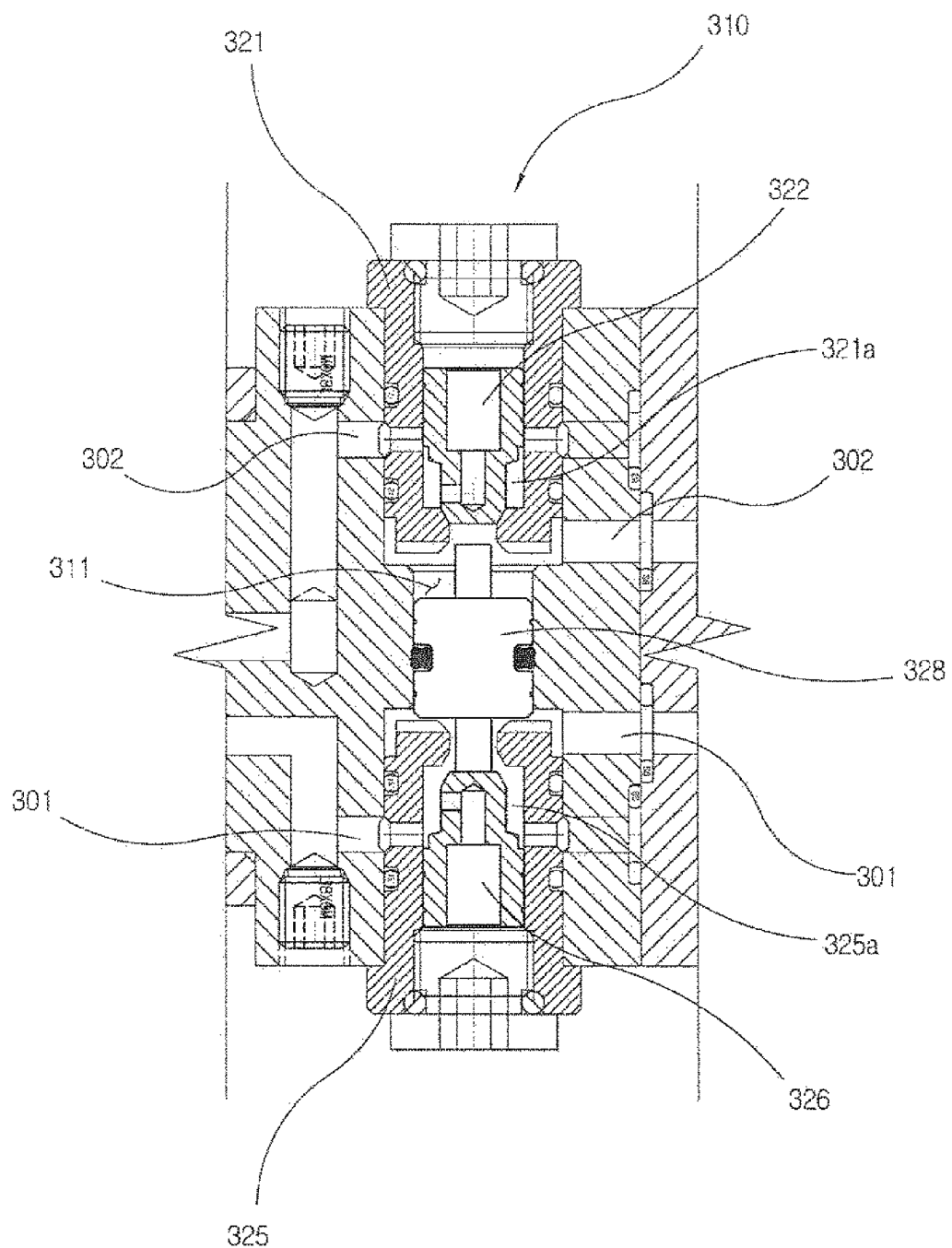
FIG. 7 is a view showing one embodiment of a bidirectional check valve of the manual hydraulic multi-functional extra-high-voltage insulating gear gripper pliers stick for live-wire work according to the present invention.

Referring to FIG. 7, the bidirectional check valve 310 may include an unfolding valve unit 321, a folding valve unit 325, and a valve piston 328.

In this case, the unfolding valve unit 321 is coupled to one side of the valve chamber 311 to close the one side of the valve chamber 311, and includes an unfolding oil chamber 321a formed therein to connect the separated parts of the second unfolding flow path 301 to each other via a through-hole (not shown in the drawings) or the like.

In addition, an unfolding valve 322 is provided in the unfolding oil chamber 321a. The unfolding valve 322 is configured to slide in conjunction with the valve piston 328 to be described later, and connects or disconnects the separated parts of the second unfolding flow path 301 to or from each other during the sliding movement thereof.

The folding valve unit 325 is coupled to the opposite side of the valve chamber 311 to close the opposite side of the valve chamber 311, and includes a folding oil chamber 325a formed therein to connect the separated parts of the second folding flow path 302 to each other via a through-hole (not shown in the drawings) or the like.

In addition, a folding valve 326 is provided in the folding oil chamber 325a. The folding valve 326 is configured to slide in conjunction with the valve piston 328 to be described later, and connects or disconnects the separated parts of the second folding flow path 302 to or from each other during the sliding movement thereof.

The valve piston 328 is formed between the unfolding valve unit 321 and the folding valve unit 325 in the valve chamber 311, and is operated by the hydraulic pressure so as to perform reciprocating sliding in the valve chamber 311. During the operation thereof, the valve piston 328 reacts to the unfolding valve 322 or the folding valve 326 to adjust the opening/closing amount of the unfolding valve 322 or the folding valve 326.

That is, when hydraulic pressure is applied to the part of the second unfolding flow path 301 that is connected to the first unfolding flow path 201, the valve piston 328 is pushed by the hydraulic pressure that is transmitted to the opposite part of the second unfolding flow path 301, and thus the bidirectional check valve 310 is opened to enable the flow of oil through the unfolding valve 322 and the unfolding oil chamber 321a of the unfolding valve unit 321.

On the other hand, when hydraulic pressure is applied to the part of the second folding flow path 302 that is connected to the first folding flow path 202, the valve piston 328 is pushed by the hydraulic pressure that is transmitted to the opposite part of the second folding flow path 302, and thus the bidirectional check valve is opened to enable the flow of oil through the folding valve 326 and the folding oil chamber 325a of the folding valve unit 325.

Figure 8:
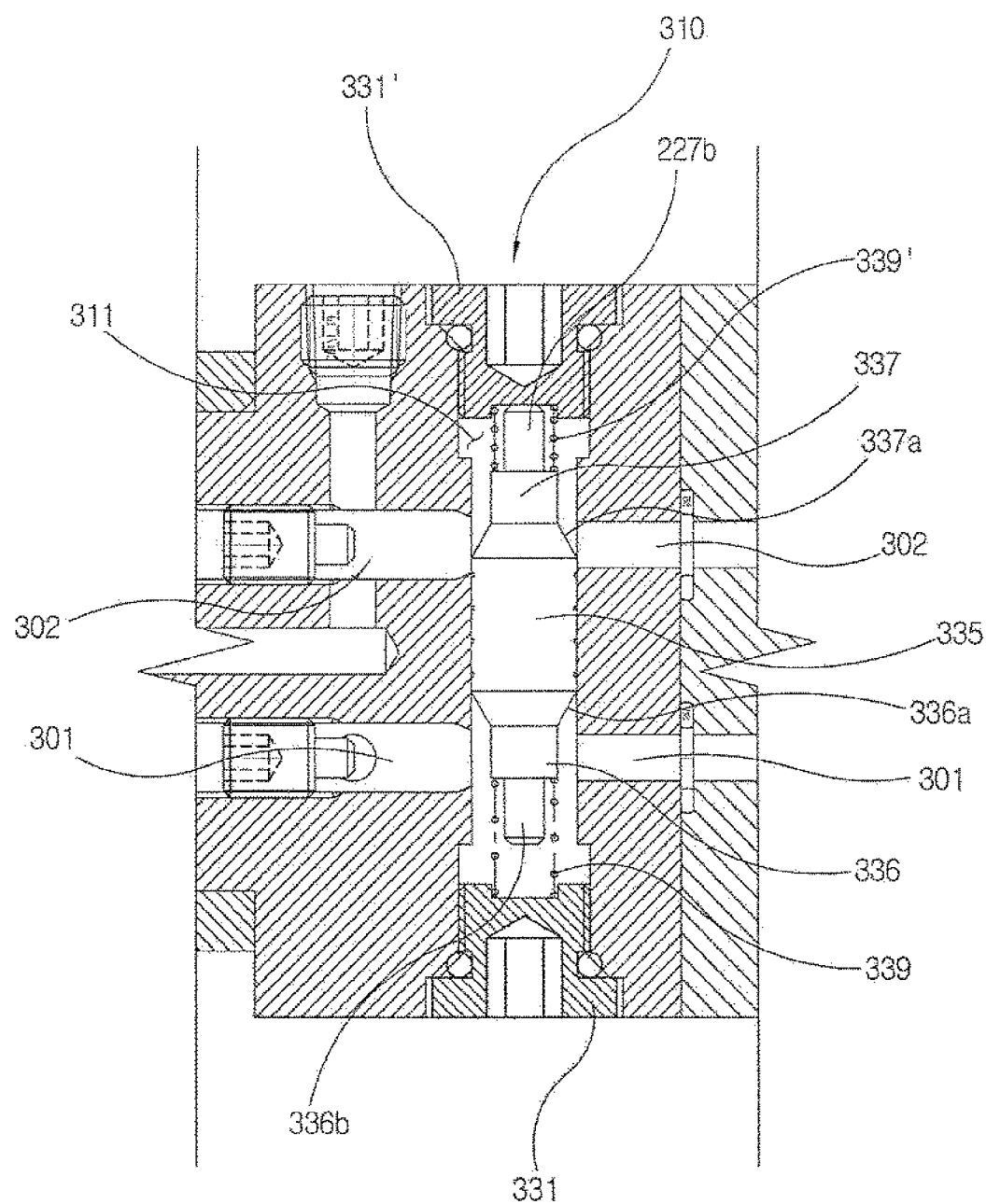
FIG. 8 is a view showing another embodiment of a bidirectional check valve of the manual hydraulic multi-functional extra-high-voltage insulating gear gripper pliers stick for live-wire work according to the present invention.

Referring to FIG. 8, the bidirectional check valve 310 may include closing caps 331 and 331', a valve piston 335, and piston springs 339 and 339'.

In this case, the closing caps 331 and 331' are coupled to opposite sides of the valve chamber 311 to close the valve chamber 311.

The valve piston 335 is formed between the closing caps 331 and 331' in the valve chamber 311, and is operated so as to perform reciprocating sliding in the valve chamber 311 by the hydraulic pressure transmitted to the second unfolding flow path 301 or the second folding flow path 302. During the operation thereof, the valve piston 335 adjusts the opening/closing amount of the second unfolding flow path 301 or the second folding flow path 302.

In this case, an unfolding flow path communication portion 336 and a folding flow path communication portion 337 are formed at opposite sides of the valve piston 335, respectively.

First, the unfolding flow path communication portion 336 includes an inclined surface 336a, which extends from one end of the valve piston 335 such that the diameter thereof gradually decreases, and an unfolding flow path support protrusion 336b, which is formed at an end thereof so as to interfere with one 331 of the closing caps during the sliding movement of the valve piston 335.

Accordingly, when hydraulic pressure is applied to the second unfolding flow path 301, the valve piston 335 is guided to move to the second folding flow path 302 by the inclined surface 336a of the unfolding flow path communication portion 336, thereby forming or interrupting the connection between the second unfolding flow path 301 and the valve chamber 311.

In addition, the folding flow path communication portion 337 includes an inclined surface 337a, which extends from the opposite end of the valve piston 335 such that the diameter thereof gradually decreases, and a folding flow path support protrusion 337b, which is formed at an end thereof so as to interfere with the other one 331' of the closing caps during the sliding movement of the valve piston 335.

Accordingly, when hydraulic pressure is applied to the second folding flow path 302, the valve piston 335 is guided to move to the second unfolding flow path 301 by the inclined surface 337a of the folding flow path communication portion 337, thereby forming or interrupting the connection between the second folding flow path 302 and the valve chamber 311.

Two piston springs 339 and 339' are provided in a pair, and are elastically mounted between opposite ends of the valve piston 335 and the respective closing caps 331 and 331'. The piston springs 339 and 339' have the same elastic force as each other, and apply restoring elastic force to the valve piston 335.

That is, when hydraulic pressure is applied to the part of the second unfolding flow path 301 that is connected to the first unfolding flow path 201, the valve piston 335 is pushed to the second folding flow path 302 by the hydraulic pressure transmitted to the opposite part of the second unfolding flow path 301 via the inclined surface 336a of the unfolding flow path communication portion 336, and the bidirectional check valve 310 opens the two parts of the second unfolding flow path 301 and enables the flow of oil through connection with the valve chamber 311 due to the opening of the unfolding flow path communication portion 336.

Meanwhile, when the valve piston 335 is pushed to the second folding flow path 302, the folding flow path support protrusion 337b of the folding flow path communication portion 336 comes into contact with the opposite one 331' of the closing caps, and the inclined surface 337a is located in the middle portion of the second folding flow path 302, thereby opening the second folding flow path 302 to some extent and enabling the flow of oil to some extent.

On the other hand, when hydraulic pressure is applied to the part of the second folding flow path 302 that is connected to the first folding flow path 202, the valve piston 335 is pushed to the second unfolding flow path 301 by the hydraulic pressure transmitted to the opposite part of the second folding flow path 302 via the inclined surface 337a of the folding flow path communication portion 337, thereby opening the two parts of the second folding flow path 302 and enabling the flow of oil through connection with the valve chamber 311 due to the opening of the folding flow path communication portion 337.

Meanwhile, when the valve piston 335 is pushed to the second unfolding flow path 301, the unfolding flow path support protrusion 336b of the unfolding flow path communication portion 336 comes into contact with the one 331 of the closing caps, and the inclined surface 336a is located in the middle portion of the second unfolding flow path 301, thereby opening the second unfolding flow path 301 to some extent and enabling the flow of oil to some extent.

Figure 9:
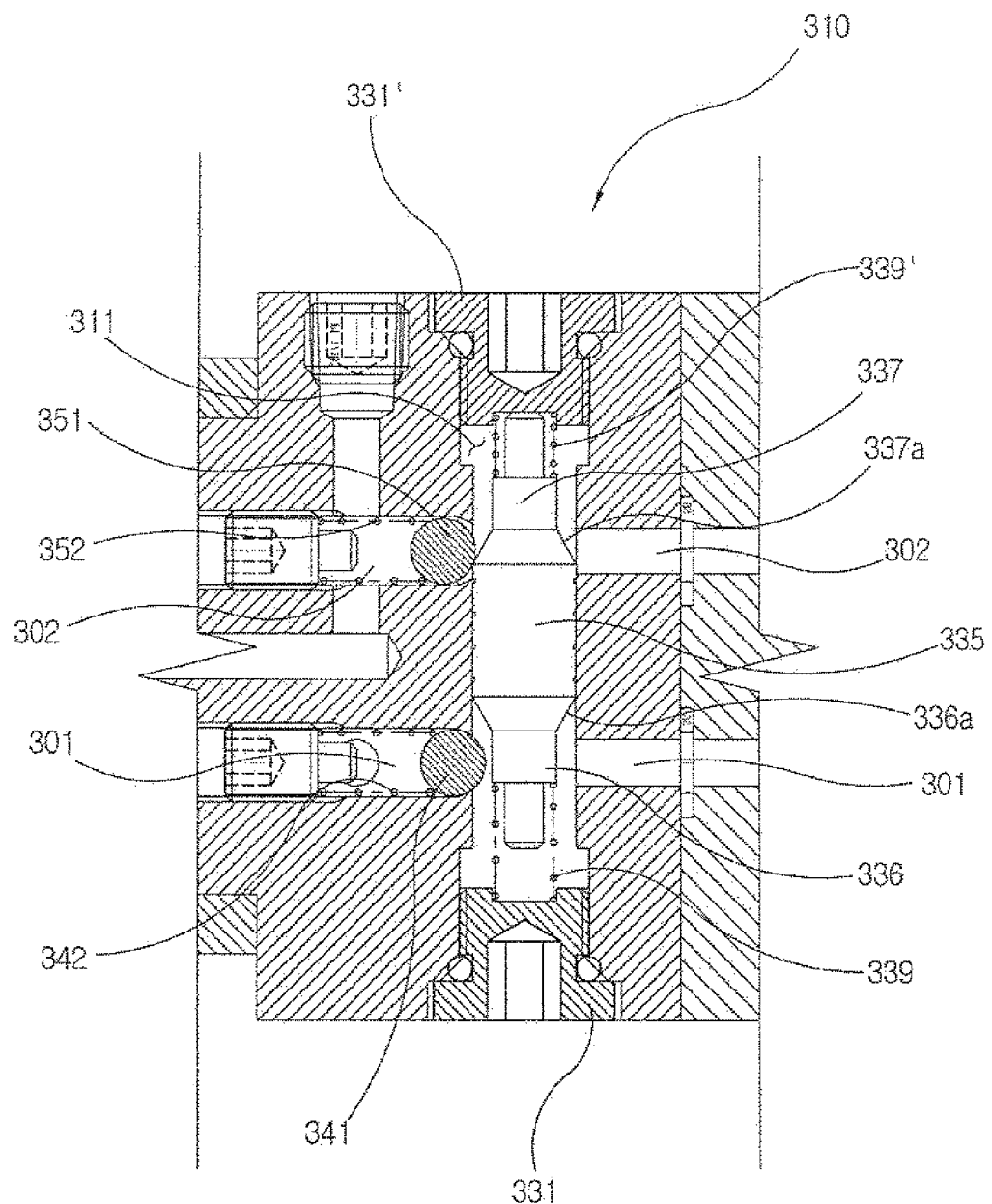
FIG. 9 is a view showing another embodiment of a bidirectional check valve of the manual hydraulic multi-functional extra-high-voltage insulating gear gripper pliers stick for live-wire work according to the present invention.

Meanwhile, in addition to the closing caps 331 and 331', the valve piston 335, and the piston springs 339 and 339', which are shown in FIG. 8, the bidirectional check valve 310, in another embodiment, may further include an unfolding flow path check valve 341, which is provided in the front part of the second unfolding flow path 301, and a folding flow path check valve 351, which is provided in the front part of the second folding flow path 302, as shown in FIG. 9.

First, the unfolding flow path check valve 341 may be formed in a "spherical-shaped" ball type, which is elastically supported by a spring 342 mounted in the front part of the second unfolding flow path 301 so as to protrude into the valve chamber 311 and to block connection with the valve chamber 311.

In this case, a stepped protrusion 301a is further formed on the end portion of the second unfolding flow path 301 that is adjacent to the valve chamber 311, and the unfolding flow path check valve 341 is formed to be smaller than the diameter of the second unfolding flow path 301. Thus, when hydraulic pressure is applied to the second unfolding flow path 301, the hydraulic pressure pushes the unfolding flow path check valve 341 to open the second unfolding flow path 301, thereby enabling the flow of oil.

In addition, the folding flow path check valve 351 may be formed in a "spherical-shaped" ball type, which is elastically supported by a spring 352 mounted in the front part of the second folding flow path 302 so as to protrude into the valve chamber 311 and to block connection with the valve chamber 311.

In this case, a stepped protrusion 302a is further formed on the end portion of the second folding flow path 302 that is adjacent to the valve chamber 311, and the folding flow path check valve 351 is formed to be smaller than the diameter of the second folding flow path 302. Thus, when hydraulic pressure is applied to the second folding flow path 302, the hydraulic pressure pushes the folding flow path check valve 351 to open the second folding flow path 302, thereby enabling the flow of oil.

That is, when hydraulic pressure is applied to one part of the second unfolding flow path 301, the valve piston 335 is pushed to the second folding flow path 302 by the hydraulic pressure transmitted to the opposite part of the second unfolding flow path 301 via the inclined surface 336a of the unfolding flow path communication portion 336, thereby opening the two parts of the second unfolding flow path 301 and enabling the flow of oil through connection with the valve chamber 311 due to the opening of the unfolding flow path communication portion 336. Accordingly, the pressure of oil pushes the unfolding flow path check valve 341, thereby opening the second unfolding flow path 301 and enabling the flow of oil.

In this case, the inclined surface 337a of the folding flow path communication portion 337 of the valve piston 335 pushes the folding flow path check valve 351, which protrudes into the valve chamber 311, to some extent to open the second folding flow path 302 to some extent, thereby enabling the flow of a predetermined amount of oil to the second folding flow path 302.

On the other hand, when hydraulic pressure is applied to the part of the second folding flow path 302 that is connected to the first folding flow path 202, the valve piston 335 is pushed to the second unfolding flow path 301 by the hydraulic pressure transmitted to the opposite part of the second folding flow path 302 via the inclined surface 337a of the folding flow path communication portion 337, thereby opening the two parts of the second folding flow path 302 and enabling the flow of oil through connection with the valve chamber 311 due to the opening of the folding flow path communication portion 337. Accordingly, the pressure of oil pushes the folding flow path check valve 351, thereby opening the second folding flow path 302 and enabling the flow of oil.

In this case, the inclined surface 336a of the unfolding flow path communication portion 336 of the valve piston 335 pushes the unfolding flow path check valve 341, which protrudes into the valve chamber 311, to some extent to open the second unfolding flow path 301 to some extent, thereby enabling the flow of a predetermined amount of oil to the second unfolding flow path 301.

The cylinder unit 400 is connected to the distal end of the fixed block 300, and includes a third unfolding flow path 401 formed therein, which is open backwards so as to be connected to the second unfolding flow path 301 of the fixed block 300, and a third folding flow path 402 formed therein, which is open backwards so as to be connected to the second folding flow path 302 of the fixed block 300.

In this case, the cylinder unit 400 includes a cylinder body 410. The cylinder body 410 is configured to be connected at the rear portion thereof to the distal end of the fixed block 300, and includes a piston chamber 411 formed therein, which is open forwards.

In addition, the third unfolding flow path 401 is formed to penetrate the rear portion of the cylinder body so as to connect the second unfolding flow path 301 to one side of the piston chamber 411, and the third folding flow path 402 is formed in the rear center portion of the cylinder body so as to connect the second folding flow path 302 to the center portion of the piston chamber 411.

In addition, the cylinder unit 400 includes a guide pipe 420. The guide pipe 420 is formed in a horizontal pipe type, and has a through-hole 421 formed in the center portion thereof so as to enable the flow of oil therethrough.

In this case, in the state of being accommodated in the piston cylinder 411, the guide pipe 420 is coupled at the rear end thereof to the third folding flow path 402 so that the third folding flow path 402 and the through-hole 421 communicate with each other.

In addition, the cylinder unit 400 includes a cylinder rod 430. The cylinder rod 430 is configured to enter the piston chamber 411 and to protrude forwards from the cylinder body 410. The cylinder rod 430 is provided at the rear end thereof with a cylinder piston 431, which is accommodated in the piston chamber 411 and is moved forwards and backwards by the operation of hydraulic pressure.

In this case, the cylinder rod 430 has a guide groove 432 formed therein from the cylinder piston 431 to the inner center portion of the cylinder rod 430 so that the front portion of the guide pipe 420 enters the rear center portion of the cylinder rod 430 and slides therein in a watertight manner.

In addition, a flow path communication hole 433 is formed in the circumferential portion of the cylinder rod 430 so as to communicate with the guide groove 432.

In addition, the cylinder unit 400 includes a closing cap 440. The closing cap 440 is coupled to the front portion of the cylinder body 410 in a thread engagement manner or the like to close the piston chamber 411. The cylinder rod 430 penetrates the center portion of the closing cap 440, and slides therethrough in a watertight manner.

In addition, the cylinder unit has an oil groove 441 formed in the rear end thereof so as to be open backwards. The oil groove 441 is formed to have a diameter larger than that of the cylinder rod 430, so as to be capable of surrounding the cylinder rod 430, and smaller than that of the piston chamber

411. The oil groove 441 communicates with the piston chamber 411 and the flow path communication hole 433 in the cylinder rod 430.

That is, when the hydraulic pressure is applied to the cylinder unit 400 through the third unfolding flow path 401 and the hydraulic pressure is applied to the cylinder unit 400 from the rear side of the piston chamber 411, the cylinder unit 400 pushes the rear surface of the cylinder piston 431 to make the cylinder rod 430 move forwards. On the other hand, when the hydraulic pressure is applied to the cylinder unit 400 through the third folding flow path 402, the hydraulic pressure enters the guide groove 432 in the cylinder piston 431 through the guide pipe 420 and is applied thereto. Then, the hydraulic pressure is discharged into the oil groove 441 in the closing cap 440 through the flow path communication hole 433 in the cylinder rod 430 and pushes the front portion of the cylinder piston 431 to make the same move backwards.

The insulated extension stick 500 is configured to extend the length of the manual hydraulic multi-functional extra-high-voltage insulating gear gripper pliers stick 1 for live-wire work according to the present invention, and is formed in a hollow bar shape.

In this case, the insulated extension stick 500 is coupled to the cylinder body 410 of the cylinder unit 400 such that the rear end thereof surrounds the same, and protrudes forwards.

In addition, an operation bar 510 is provided in the insulated extension stick 500. The operation bar 510 is coupled at the rear end thereof to the distal end of the cylinder rod 430, and protrudes forwards. The operation bar 510 is operated in conjunction with the forward and backward operation of the cylinder rod 430.

In addition, the insulated extension stick 500 may further include a handle safe-distance portion 520 protruding from the outer circumferential portion thereof so that a user is capable of determining whether a safe distance for live-wire work is assured.

The gear gripper unit 20 is configured to be folded and unfolded according to the operation of hydraulic pressure of the handle operation unit 10, and includes a grip holder 600, pliers mounting brackets 700 and 700', and pliers 1000.

Figure 10:
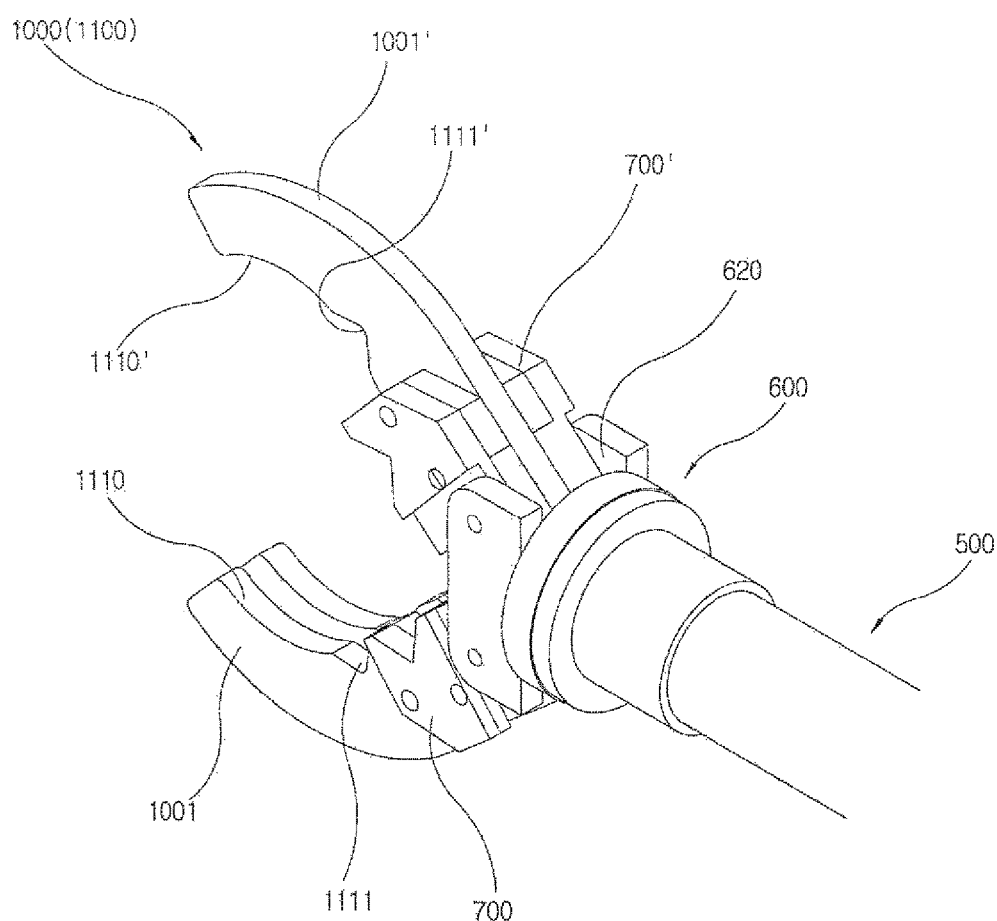
FIG. 10 is a perspective view of main components disposed at the front portion of the manual hydraulic multi-functional extra-high-voltage insulating gear gripper pliers stick for live-wire work according to the present invention.
Figure 11:
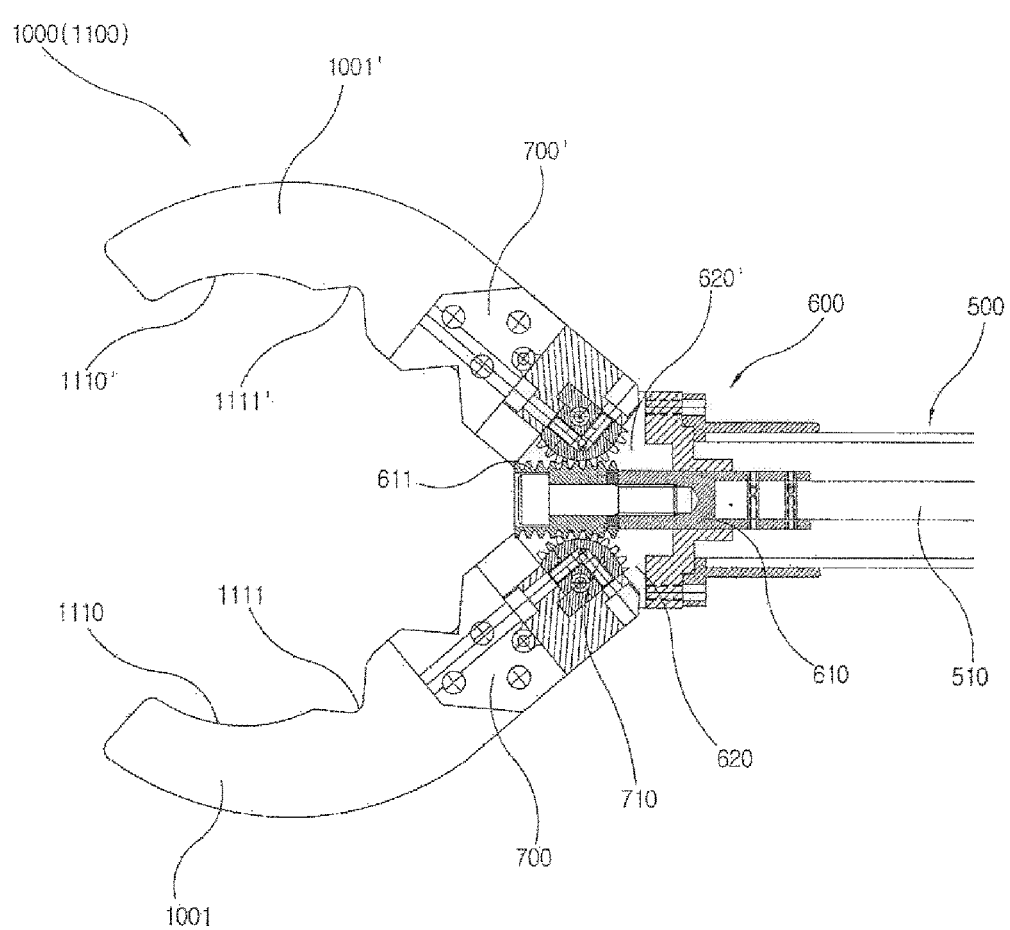
FIG. 11 is a side cross-sectional view of main components disposed at the front portion of the manual hydraulic multi-functional extra-high-voltage insulating gear gripper pliers stick for live-wire work according to the present invention.

Here, the grip holder 600, as shown in FIGS. 10 and 11, is formed at the front portion of the insulated extension stick 500, and a sliding bar 610 is provided in the center of the grip holder 600 so as to penetrate the same.

In this case, a rectangular-shaped rack gear 611, which has threads formed in opposite sides thereof, is formed in the circumferential portion of the front portion of the sliding bar 610. The distal end of the operation bar 510 is coupled to the rear end of the sliding bar 610 so that the sliding bar 610 is operated in conjunction with the forward and backward operation of the operation bar 510.

In addition, the grip holder 600 has a pair of mounting bracket operation recesses 620 and 620' formed in opposite sides of the front portion thereof. The mounting bracket operation recesses 620 and 620' are formed to be open forwards and bilaterally and to be connected to the rack gear 611 of the sliding bar 610.

The pliers mounting brackets 700 and 700' are provided in a pair, and are configured to be unfolded or folded in cooperation with the rack gear 611 of the sliding bar 610.

In this case, each of the pliers mounting brackets 700 and 700' has a pinion gear 710 formed in the rear end thereof so as to be threadedly engaged with the rack gear 611 of the sliding bar 610. The center of the pinion gear 710 is pivotably mounted to each of the mounting bracket operation recesses 620 and 620' of the grip holder 600.

The pliers 1000 are mounted to the pliers mounting brackets 700 and 700' using coupling means such as pins or bolts so as to be unfolded and folded together with the pliers mounting brackets 700 and 700', and are used as a work tool during live-wire work.

In this case, the pliers 1000 include a pair of folding bars 1001 and 1001', which are configured to be unfolded or folded together with the pliers mounting brackets 700 and 700' by the operation of the rack gear 611 and the pinion gear 710 during the sliding movement of the cylinder rod 430. Various different types of pliers 1000 are provided and mounted to the pliers mounting brackets 700 and 700' so as to be interchangeable, thereby enabling various types of work during live-wire work.

First, referring to FIGS. 10 and 11, one of the various types of pliers 1000 may be gripper pliers 1100 that include folding bars 1001 and 1001' having gripping force when folded. Gripping recesses 1110 and 1110' are formed with a gentle curvature in the inner circumferential surfaces of the folding bars 1001 and 1001' that face each other, respectively, in order to grip a wire, and triangular-shaped wire-seating recesses 1111 and 1111' are formed at positions in the gripping recesses 1110 and 1110' that correspond to each other, respectively. At least one wire-seating recess is formed in each of the gripping recesses. The gripper pliers 1100 enable gripping of a wire or the like during live-wire work.

In this case, any one folding bar 1001 of the folding bars 1001 and 1001' may be formed to be divided into two pieces that are spaced apart from each other by a predetermined gap. During the folding operation, the other folding bar 1001' may pass through the gap between the two pieces of the folding bar 1001 and cross the folding bar 1001, thereby enabling gripping of a wire regardless of the size of the wire. In particular, this crossing structure may enable not only gripping of a wire or the like but also provision of spreading force for spreading a wire or the like using the tips of the folding bars 1001 and 1001'.

Figure 12:
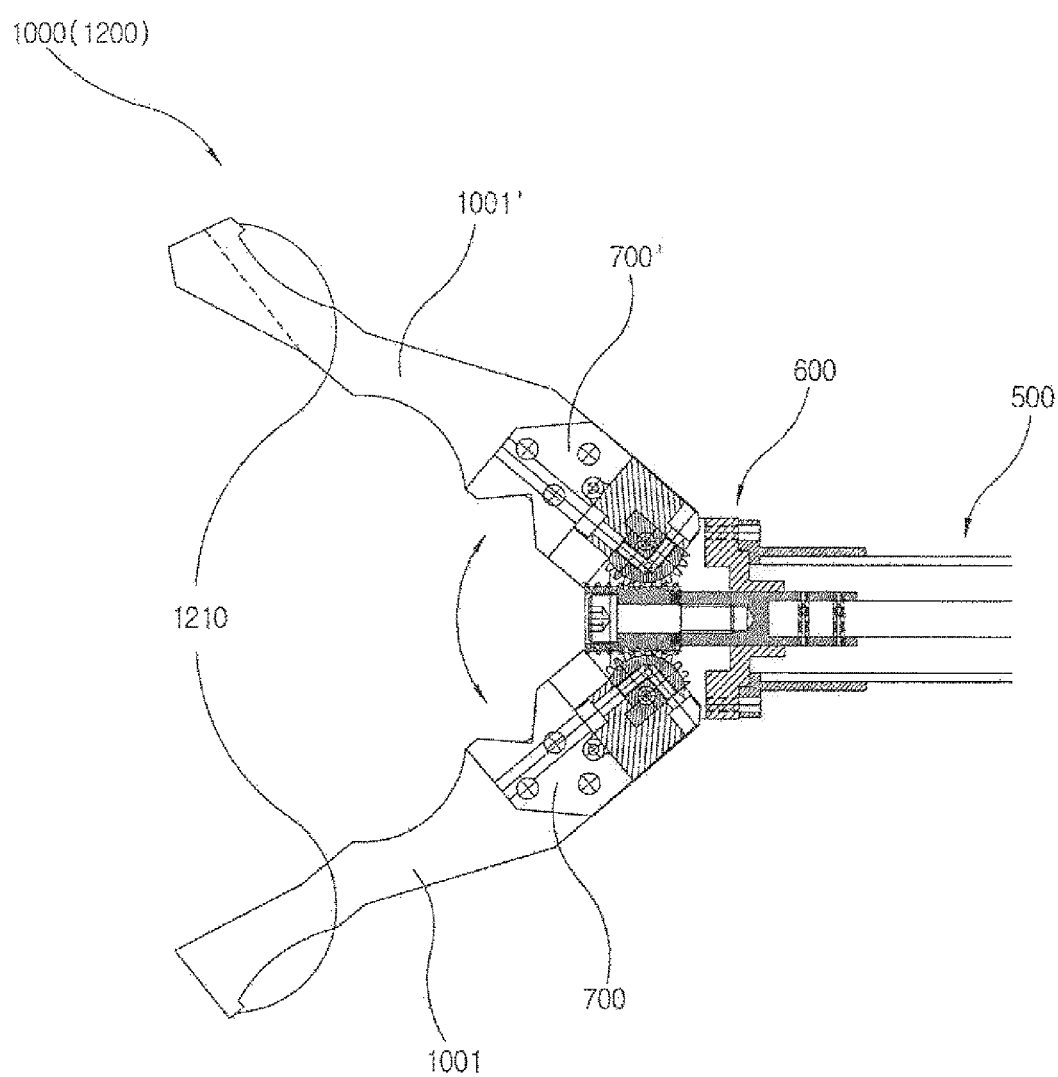
FIG. 12 is a view showing another embodiment of pliers of the manual hydraulic multi-functional extra-high-voltage insulating gear gripper pliers stick for live-wire work according to the present invention.

In addition, as shown in FIG. 12, the pliers 1000 may be configured as snap pliers 1200 that provide external force (spreading force) for spreading a wire or the like when unfolded. Spreading portions 1210 are protrudingly formed at the outer surfaces of the tips of the folding bars 1001 and 1001' so as to be symmetrical with each other. During live-wire work, the snap pliers 1200 may be used to spread, peel off, or put on a sleeve cover, a dead-end cover enveloping a dead-end clamp, or the like.

Figure 13:
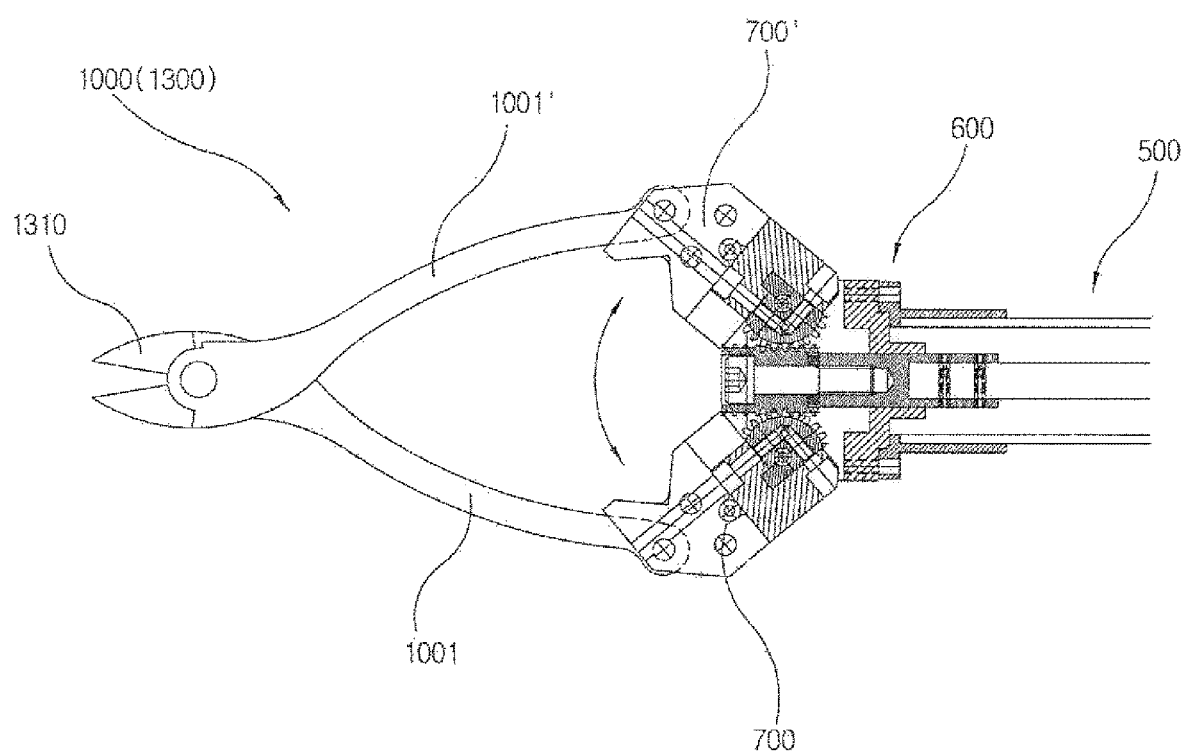
FIG. 13 is a view showing another embodiment of pliers of the manual hydraulic multi-functional extra-high-voltage insulating gear gripper pliers stick for live-wire work according to the present invention.

In addition, as shown in FIG. 13, the pliers 1000 may be configured as nipper pliers 1300 that have cutting force when folded. Cutting portions 1310 are formed at the inner surfaces of the tips of the folding bars 1001 and 1001'. During live-wire work, the nipper pliers 1300 may be used to cut a bind wire, a sheath, a wire, or the like.

Figure 14:
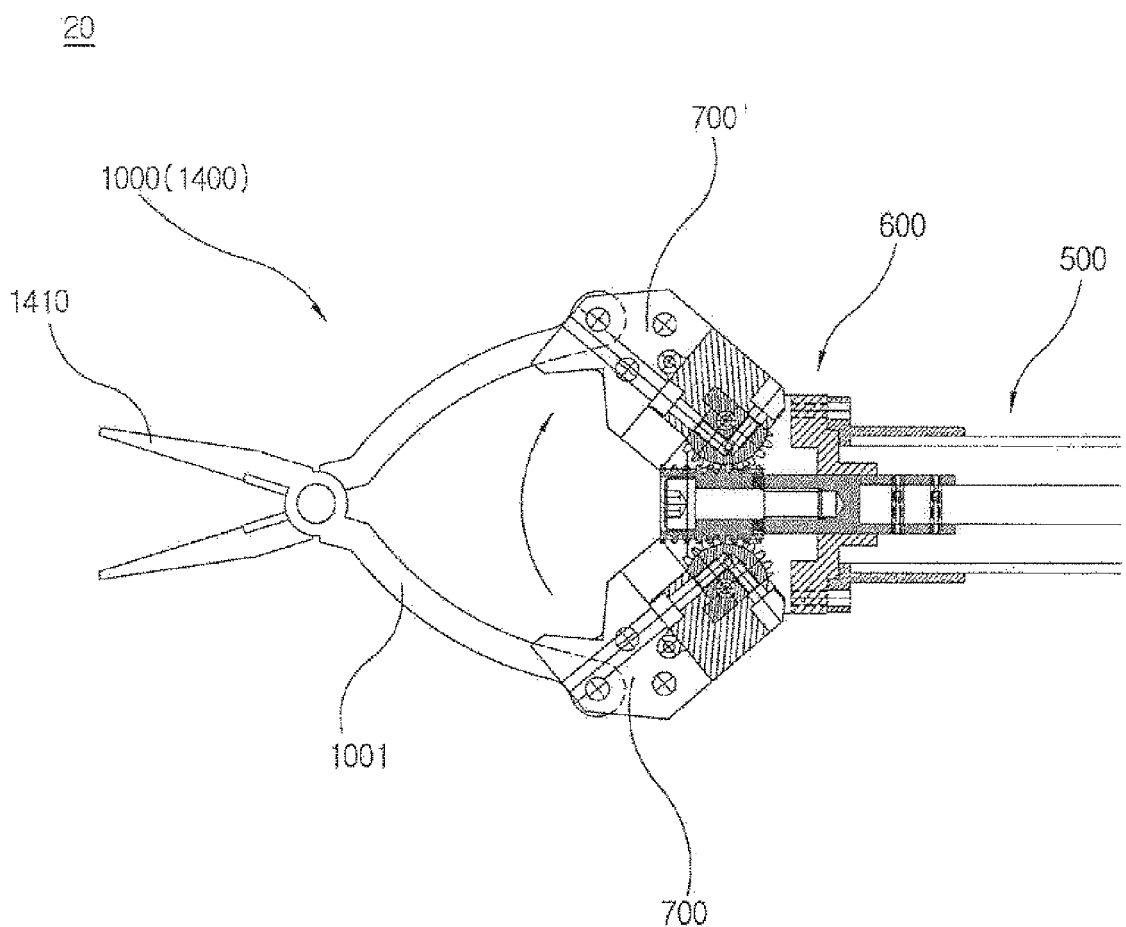
FIG. 14 is a view showing another embodiment of pliers of the manual hydraulic multi-functional extra-high-voltage insulating gear gripper pliers stick for live-wire work according to the present invention.

In addition, as shown in FIG. 14, the pliers 1000 may be configured as long nose pliers 1400 that have gripping force when folded. Pincer portions 1410 are formed at the inner surfaces of the tips of the folding bars 1001 and 1001'. During live-wire work, the long nose pliers 1400 may be used to grip a small part or the like.

Figure 15:
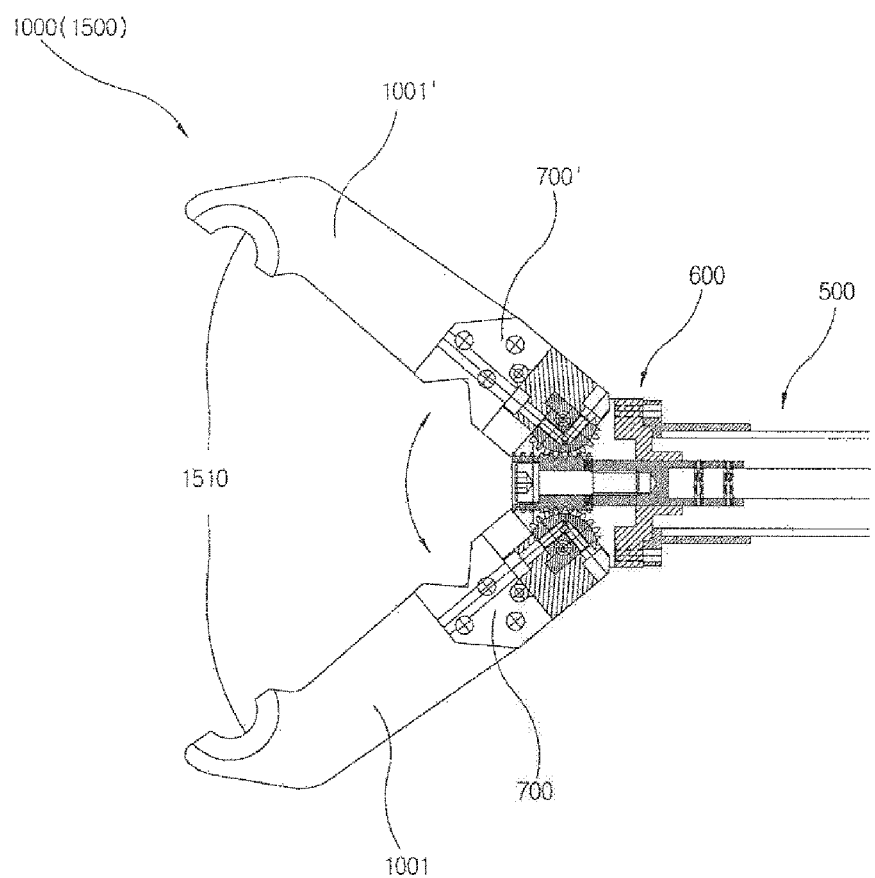
FIG. 15 is a view showing another embodiment of pliers of the manual hydraulic multi-functional extra-high-voltage insulating gear gripper pliers stick for live-wire work according to the present invention.

In addition, as shown in FIG. 15, the pliers 1000 may be configured as pin-gripping pliers 1500 that have gripping force when folded. Semicircular-shaped pin-gripping recesses 1510 are formed in the inner surfaces of the tips of the folding bars 1001 and 1001'. During live-wire work, the pin-gripping pliers 1500 may be used to grip a connection pin (a cotter pin) used to connect a suspension insulator or the like.

That is, various types of pliers 1000 may be provided. The gripper pliers 1100, the nipper pliers 1300, the long nose pliers 1400, the snap pliers 1200, or the pin-gripping pliers 1500 may be used by replaceably mounting the folding bars 1001 and 1001' to the pliers mounting brackets 700 and 700' using coupling means such as pins or bolts.

Hereinafter, an indirect live-wire construction method using the manual hydraulic multi-functional extra-high-voltage insulating gear gripper pliers stick for live-wire work according to the present invention constructed as described above will be described in detail with reference to the accompanying drawings.

The indirect live-wire construction method using the manual hydraulic multi-functional extra-high-voltage insulating gear gripper pliers stick for live-wire work according to the present invention enables power distribution construction in the presence of a live high-voltage wire using the manual hydraulic multi-functional extra-high-voltage insulating gear gripper pliers stick 1 for live-wire work constructed as described above. This enables a worker to pump hydraulic pressure using the handle operation unit 10 and to operate the pliers 1000 according thereto while assuring a safe separation distance from a power distribution line using the insulated extension stick 500.

That is, using the pliers 1000, a worker may perform the work of gripping a wire or the like, the work of spreading, peeling off, or putting on a sleeve cover, a dead-end cover enveloping a dead-end clamp, or the like, the work of cutting a bind wire, a sheath, a wire, or the like, the work of gripping a small part or the like, or the work of gripping a connection pin (a cotter pin) used to connect a suspension insulator or the like.

A detailed description will be made below.

Figure 16:
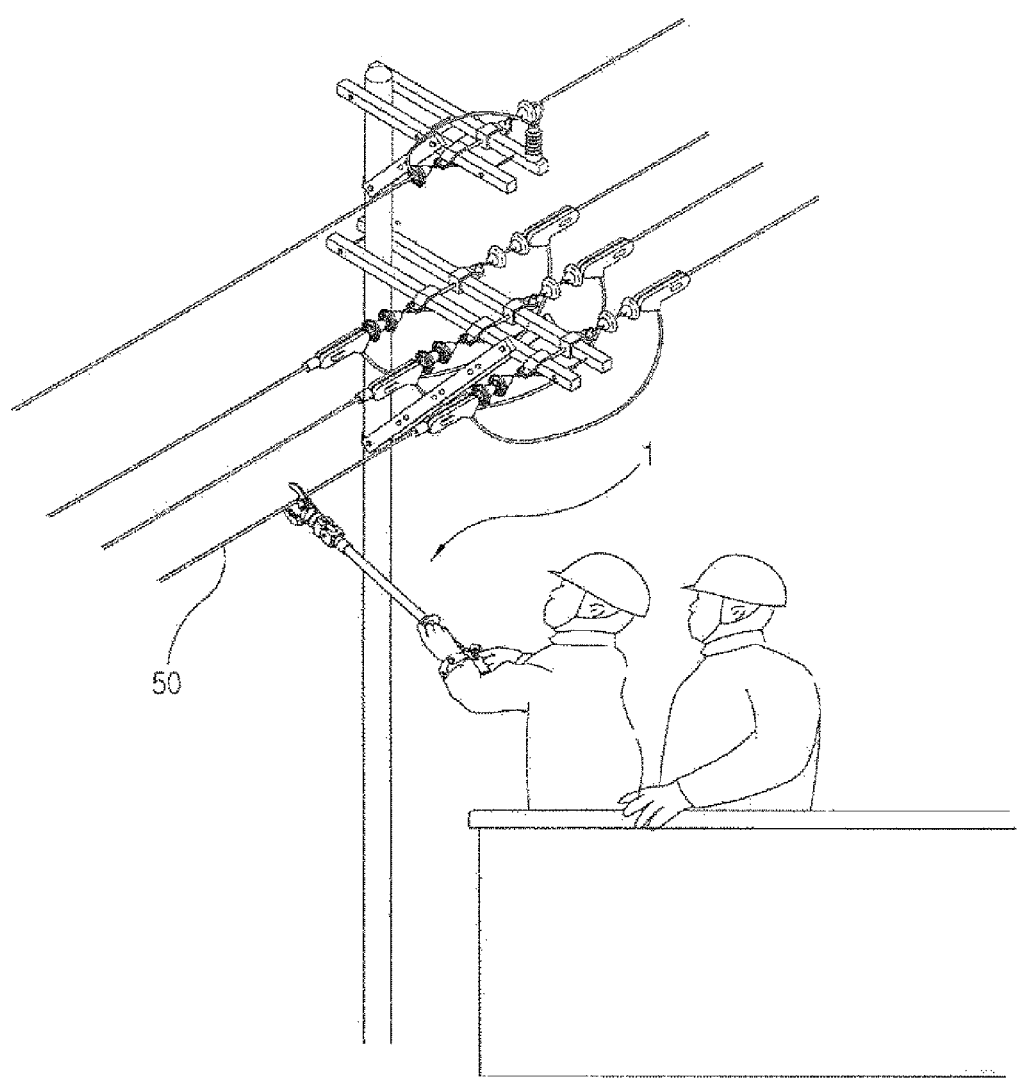
FIG. 16 is a view showing a work preparation state in an indirect live-wire construction method using the manual hydraulic multi-functional extra-high-voltage insulating gear gripper pliers stick for live-wire work according to the present invention.

First, as shown in FIG. 16, a main worker who performs indirect live-wire work and an assistant who assists in the work carry the pliers stick 1 necessary for the work, and move to a safe point distant from a power line so as to assure a safe separation distance from the power line.

Meanwhile, when moving to a safe point distant from the power line as described above, the workers may move to the safe point while assuring the safe separation distance from the power line using a live-wire bucket. The safe separation distance may be appropriately adjusted in consideration of the length of the insulated extension stick 500 of the pliers stick 1 according to the present invention.

That is, in the case in which a power line is located relatively close to the ground, workers may directly approach the power line, and in the case in which a power line is located at a portion of an electric pole that is relatively distant from the ground, workers may approach the power line using a separate live-wire bucket.

In this case, when carrying the pliers stick 1, the workers may carry at least one of the gripper pliers 1100, the nipper pliers 1300, the long nose pliers 1400, the snap pliers 1200, or the pin-gripping pliers 1500, which are replaceably mounted to the pliers mounting brackets 700 and 700'.

Thereafter, the workers may perform typical power distribution construction in the presence of a live wire.

In this case, according to the present invention, when performing live-wire work as described above, workers who are wearing insulating equipment may perform indirect live-wire work while assuring a safe distance and thereby avoiding direct contact with the power line using the pliers stick 1 according to the present invention.

Here, the manual hydraulic multi-functional extra-high-voltage insulating gear gripper pliers stick 1 for live-wire work according to the present invention, described above with reference to FIGS. 1 to 15, enables the worker to safely perform various kinds of work, for example, gripping an electric wire 50, while assuring a safe distance during live-wire work, as shown in FIG. 16. This enables assurance of a predetermined distance far from the electric wire 50 using the insulated extension stick 500, enables the unfolding and folding operation of the pliers mounting brackets 700 and 700', which are formed at the distal end of the insulated extension stick, through the operation of the pumping unit 200 formed at the rear portion of the insulated extension stick, and enables the operation of the pliers 1000 mounted to the pliers mounting brackets 700 and 700' corresponding thereto.

Described in detail, when the pliers 1000 are unfolded, as shown in FIGS. 4 to 6, the directional control valve 240 of the pumping unit 200 is operated so that the connection flow path 231, the first flow path 241, and the front part of the first unfolding flow path 201 are connected to one another and so that the first folding flow path 202 and the second flow path 242 are connected to each other, and in this state, the hydraulic lever 221 of the pumping unit 200 is pressed.

That is, pressure is applied to the pressure chamber 220 by operating the hydraulic lever 221 and pressing the piston 223. The pressure causes the oil in the pressure chamber 220 to be supplied to the directional control valve 240 via the connection flow path 231, but the supply of oil to the branch chamber 230 is interrupted by the blocking of the one-way check valve 232.

Accordingly, when the oil in the pressure chamber 220 is pressurized, the oil is supplied forwards through the front part of the first unfolding flow path 201 via the connection flow path 231 and the first flow path 241, is supplied to the third unfolding flow path 401 of the cylinder unit 400 through the second unfolding flow path 301, and flows into the piston chamber 411.

Meanwhile, the bidirectional check valve 310, which allows or interrupts the flow of oil in the unfolding operation described above, may be formed in various configurations, as shown in FIGS. 7 and 8. First, as shown in FIG. 7, in the case in which the bidirectional check valve 310 is constituted by the unfolding valve unit 321, the folding valve unit 325, and the valve piston 328, when hydraulic pressure is applied to one part of the second unfolding flow path 301, the valve piston 328 is pushed by the hydraulic pressure transmitted to the opposite part of the second unfolding flow path 301, and the bidirectional check valve 310 is opened, thereby enabling the flow of oil through the unfolding valve 322 and the unfolding oil chamber 321a of the unfolding valve unit 321.

In addition, as shown in FIG. 8, in the case in which the bidirectional check valve is constituted by the closing caps 331 and 331', the valve piston 335, and the piston springs 339 and 339', when hydraulic pressure is applied to one part of the second unfolding flow path 301, the valve piston 335 is pushed to the second folding flow path 302 by the hydraulic pressure transmitted to the opposite part of the second unfolding flow path 301 via the inclined surface 336a of the unfolding flow path communication portion 336, and the bidirectional check valve opens the two parts of the second unfolding flow path 301 and enables the flow of oil through connection with the valve chamber 311 due to the opening of the unfolding flow path communication portion 336.

Figure 17:
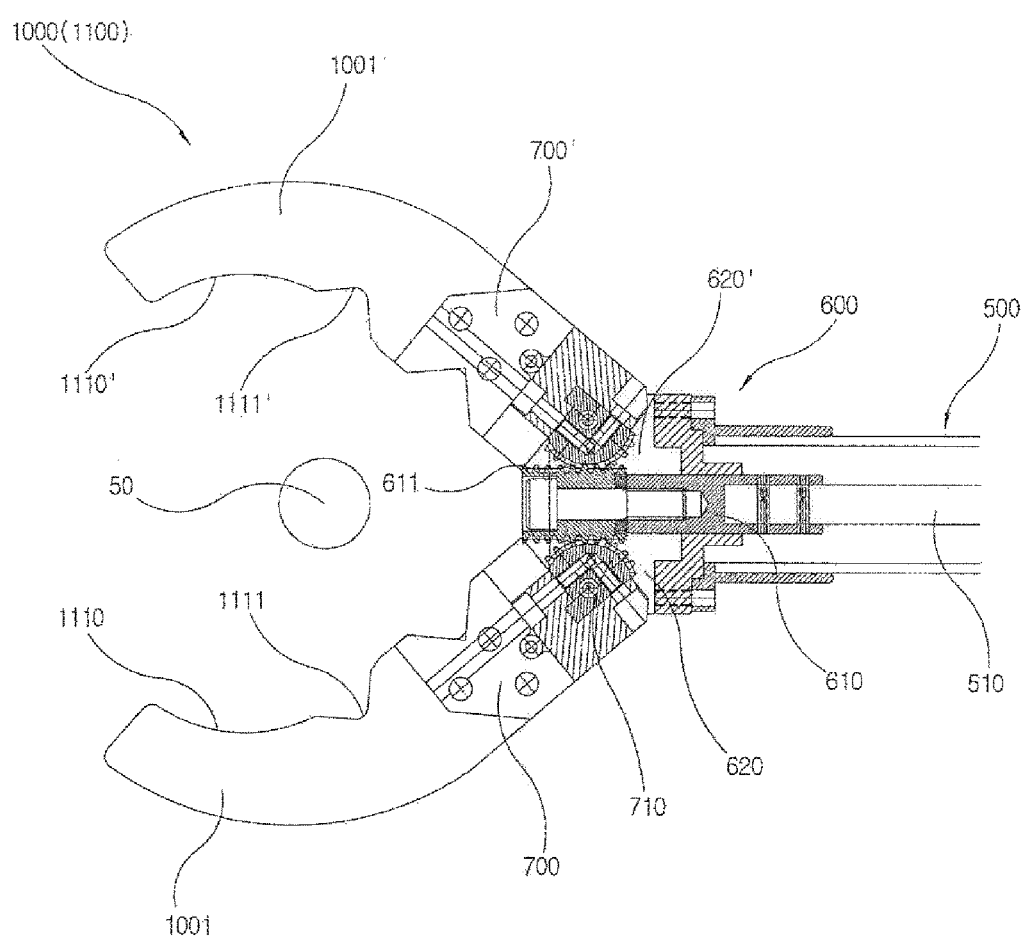
FIG. 17 is a view showing the unfolded state of the pliers stick in the indirect live-wire construction method using the manual hydraulic multi-functional extra-high-voltage insulating gear gripper pliers stick for live-wire work according to the present invention.

Accordingly, as shown in FIG. 17, the cylinder rod 430 moves forwards, and the sliding bar 610, which is connected to the cylinder rod 430 via the operation bar 510 of the insulated extension stick 500, moves forwards. In this case, the rack gear 611 formed in the sliding bar 610 moves forwards, and the pliers mounting brackets 700 and 700', the pinion gear 710 of each of which is threadedly engaged with the rack gear 611, and the pliers 1000 are unfolded so as to be spread bidirectionally.

Hereinafter, the operation of the hydraulic pressure during the above unfolding operation will be described. Referring to FIGS. 4 to 8, the oil supplied to the connection flow path 231 flows through the first flow path 241 of the directional control valve 240, and then enters the rear portion of the piston chamber 411 via the front part of the first unfolding flow path 201, the rear part of the second unfolding flow path 301, the bidirectional check valve 310, the front part of the second unfolding flow path 301, and the third unfolding flow path 401. Accordingly, the rear portion of the cylinder piston 431 of the cylinder rod 430 is pressed, and the cylinder rod 430 is pushed forwards.

Figure 18:
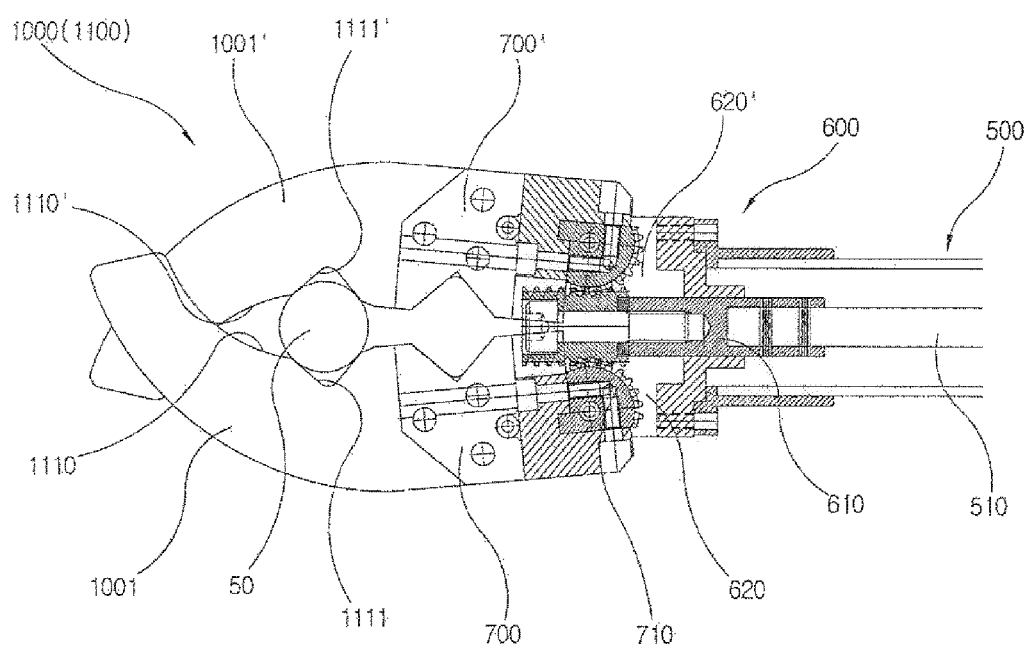
FIG. 18 is a view showing the folded state of the pliers stick in the indirect live-wire construction method using the manual hydraulic multi-functional extra-high-voltage insulating gear gripper pliers stick for live-wire work according to the present invention.

Therefore, as shown in FIG. 18, the operation bar 510, which is connected to the front portion of the cylinder rod 430, and the sliding bar 610 move forwards, and at the same time, the pliers mounting brackets 700 and 700', the pinion gear 710 of each of which is threadedly engaged with the rack gear 611, and the pliers 1000 are unfolded so as to be spread bidirectionally.

Meanwhile, when the pressure is applied as described above during the unfolding operation, oil is discharged from the front portion of the piston chamber 411 to the guide groove 432 through the oil groove 441 in the closing cap 440 and the flow path communication hole 433 formed in the cylinder rod 430. The discharged oil is collected in the oil tank 100 via the guide pipe 420, the third folding flow path 402, the front part of the second folding flow path 302, the bidirectional check valve 310, the rear part of the second folding flow path 302, the front part of the first folding flow path 202, the second flow path 242 of the directional control valve 240, the rear part of the first folding flow path 202, and the branch chamber 230.

Thereafter, when the force of pressing the hydraulic lever 221 operated as described above is released in the state in which the directional control valve 240 is operated in the opposite direction, the hydraulic lever 221 is returned by the elastic force of the spring 222, and the oil collected in this process is charged into the pressure chamber 220 by the suction force of the piston 223.

Thereafter, the folding operation of the pliers mounting brackets 700 and 700' is performed as follows.

The directional control valve 240 is operated in a direction opposite that in the unfolding operation so that the connection flow path 231, the second flow path 242, and the front part of the first folding flow path 202 are connected to one another and so that the first unfolding flow path 201 and the first flow path 241 are connected to each other, and in this state, the hydraulic lever 221 of the pumping unit 220 is pressed.

That is, pressure is applied to the pressure chamber 220 by operating the hydraulic lever 221 and pressing the piston 223. The pressure causes the oil in the pressure chamber 220 to be supplied to the directional control valve 240 via the connection flow path 231, but the supply of oil to the branch chamber 230 is interrupted by the blocking of the one-way check valve 232.

Accordingly, as shown in FIG. 18, the cylinder rod 430 moves backwards, and the sliding bar 610, which is connected to the cylinder rod 430 via the operation bar 510 of the insulated extension stick 500, moves backwards. In this case, the rack gear 611 formed in the sliding bar 610 moves backwards, and the pliers mounting brackets 700 and 700', the pinion gear 710 of each of which is threadedly engaged with the rack gear 611, and the pliers 1000 are folded so as to be closed.

Hereinafter, the operation of the hydraulic pressure during the above folding operation will be described. Referring to FIGS. 4 to 8, the oil supplied to the connection flow path 231 flows through the second flow path 242 of the directional control valve 240, and then enters the front portion of the piston chamber 411 via the front part of the first folding flow path 202, the rear part of the second folding flow path 302, the bidirectional check valve 310, the front part of the second folding flow path 302, the third folding flow path 402, the guide pipe 420, the guide groove 432 in the cylinder rod 430, the flow path communication hole 433, and the oil groove 441 in the closing cap 440. Accordingly, the front portion of the cylinder piston 431 of the cylinder rod 430 is pressed, and the cylinder rod 430 is pushed backwards.

Meanwhile, the bidirectional check valve 310, which allows or interrupts the flow of oil in the folding operation described above, may be formed in various configurations, as shown in FIGS. 7 and 8. First, as shown in FIG. 7, in the case in which the bidirectional check valve 310 is constituted by the unfolding valve unit 321, the folding valve unit 325, and the valve piston 328, when hydraulic pressure is applied to one part of the second folding flow path 302, the valve piston 328 is pushed by the hydraulic pressure transmitted to the opposite part of the second folding flow path 302, and the bidirectional check valve 310 is opened, thereby enabling the flow of oil through the folding valve 326 and the folding oil chamber 325a of the folding valve unit 325.

In addition, as shown in FIG. 8, in the case in which the bidirectional check valve is constituted by the closing caps 331 and 331', the valve piston 335, and the piston springs 339 and 339', when hydraulic pressure is applied to one part of the second folding flow path 302, the valve piston 335 is pushed to the second unfolding flow path 301 by the hydraulic pressure transmitted to the opposite part of the second folding flow path 302 via the inclined surface 337a of the folding flow path communication portion 337, and the bidirectional check valve opens the two parts of the second folding flow path 302 and enables the flow of oil through connection with the valve chamber 311 due to the opening of the folding flow path communication portion 337.

Accordingly, the operation bar 510, which is connected to the front portion of the cylinder rod 430, and the sliding bar 610 move backwards, and at the same time, the pliers mounting brackets 700 and 700', the pinion gear 710 of each of which is threadedly engaged with the rack gear 611, and the pliers 1000 are folded so as to be closed.

Meanwhile, when the pressure is applied as described above during the folding operation, oil is discharged from the rear portion of the piston chamber 411 and is collected in the oil tank 100 via the third unfolding flow path 401, the front part of the second unfolding flow path 301, the bidirectional check valve 310, the rear part of the second unfolding flow path 301, the front part of the first unfolding flow path 201, the first flow path 241 of the directional control valve 240, the rear part of the first unfolding flow path 201, and the branch chamber 230.

Thereafter, when the force of pressing the hydraulic lever 221 operated as described above is released in the state in which the directional control valve 240 is operated in the opposite direction, the hydraulic lever 221 is returned by the elastic force of the spring 222, and the oil collected in this process is charged into the pressure chamber 220 by the suction force of the piston 223.

That is, according to the manual hydraulic multi-functional extra-high-voltage insulating gear gripper pliers stick 1 for live-wire work according to the present invention, the pliers mounting brackets 700 and 700' are capable of being unfolded and folded by the operation of hydraulic pressure and the sliding operation of the cylinder rod 430 corresponding thereto, and accordingly, the folding bars 1001 and 1001' of the pliers 1000 that are mounted to the pliers mounting brackets 700 and 700' are capable of being unfolded and folded.

First, during live-wire work using the pliers 1000, the gripper pliers 1100 may be used to grip the electric wire 50. For example, as shown in FIGS. 17 and 18, the electric wire 50 is gripped by the wire-seating recesses 1111 and 1111' formed in the gripping recesses 1110 and 1110' in the gripper pliers 1100, and is thus stably supported without moving, thereby enabling a worker to safely grip the electric wire at a distance far from the electric wire, i.e. in the state of assuring a safe distance.

Meanwhile, various types of pliers 1000 other than the gripper pliers 1100 may be used to enable various kinds of tasks during live-wire work. To this end, various types of pliers 1000 may be replaceably mounted to the pliers mounting brackets 700 and 700' using coupling means such as pins or bolts.

First, referring to FIG. 12, when it is desired to use the snap pliers 1200, the snap pliers 1200 are mounted to the pliers mounting brackets 700 and 700'. During live-wire work, this enables the work of spreading the sheathed wire 50 or the work of spreading or putting on a sleeve cover, a dead-end cover enveloping a dead-end clamp (not shown in the drawings), or the like using the spreading portions 1210.

In addition, referring to FIG. 13, when it is desired to use the nipper pliers 1300, the nipper pliers 1300 are mounted to the pliers mounting brackets 700 and 700'. During live-wire work, this enables the work of cutting a bind wire, a sheath, a wire (not shown in the drawings), or the like using the cutting portions 1310.

In addition, referring to FIG. 14, when it is desired to use the long nose pliers 1400, the long nose pliers 1400 are mounted to the pliers mounting brackets 700 and 700'. During live-wire work, this enables the work of gripping a small part, fastening a bolt (not shown in the drawings), or gripping a part located at a deep position using the pincer portions 1410.

In addition, referring to FIG. 15, when it is desired to use the pin-gripping pliers 1500, the pin-gripping pliers 1500 are mounted to the pliers mounting brackets 700 and 700'. During live-wire work, this enables the work of gripping a connection pin (a cotter pin) (not shown in the drawings) used to connect a suspension insulator or the like using the pin-gripping recesses 1510.

Meanwhile, although the use of each of various types of pliers 1000 has been described as one embodiment, the present invention is not limited thereto. During live-wire work, the pliers 1000 may be interchangeably used so as to be suitable for a corresponding task.

That is, various types of pliers 1000 are provided, and any one of the gripper pliers 1100, the snap pliers 1200, the nipper pliers 1300, the long nose pliers 1400, and the pin-gripping pliers 1500 is interchangeably mounted to the pliers mounting brackets 700 and 700', thereby enabling various kinds of tasks using a single pliers stick 1, and thus enabling very efficient and safe live-wire work.

As described above, the manual hydraulic multi-functional extra-high-voltage insulating gear gripper pliers stick for live-wire work according to the present invention enables a worker to perform live-wire work using gripping force or spreading force thereof in the state of assuring a safe distance, thereby enhancing working convenience and safety, and further improving use efficiency.

The invention claimed is:

1. A manual hydraulic multi-functional extra-high-voltage insulating gear gripper pliers stick for live-wire work, comprising:
 a handle operation unit (10) configured to control hydraulic pressure;
 an insulated extension stick (500) in which an operation bar (510) is provided so as to be coupled at a rear end thereof to a distal end of a cylinder rod (430) and to protrude forwards, the insulated extension stick (500) being coupled at a rear end thereof to a cylinder unit (400) while surrounding the cylinder unit (400), the insulated extension stick (500) protruding forwards; and
 a gear gripper unit (20) configured to be folded and unfolded by operation of hydraulic pressure of the handle operation unit (10),
 wherein the handle operation unit (10) comprises:
 an oil tank (100) in which oil is charged, the oil tank (100) comprising an oil outlet (110) formed at a distal end thereof and an outer portion covered with a handle (120);
 a pumping unit (200) connected to the oil tank (100) to allow or interrupt of flow of oil, the pumping unit (200) comprising a first unfolding flow path (201) and a first folding flow path (202) formed therein to allow oil to flow therethrough;
 a fixed block (300) connected to a distal end of the pumping unit (200), the fixed block (300) comprising a second unfolding flow path (301) and a second folding flow path (302) formed therein so as to be connected to the first unfolding flow path (201) and the first folding flow path (202); and
 the cylinder unit (400) connected to a distal end of the fixed block (300), the cylinder unit (400) comprising a third unfolding flow path (401) formed therein so as to be connected to the second unfolding flow path (301) and a third folding flow path (402) formed therein so as to be connected to the second folding flow path (302), the cylinder rod (430) being formed at a distal end of the cylinder unit (400) so as to be slidable, and
 wherein the gear gripper unit (20) comprises:
 a grip holder (600) formed at a front portion of the insulated extension stick (500), the grip holder (600) comprising a sliding bar (610) formed through a center portion thereof, the sliding bar (610) comprising a rack gear (611) formed in a front portion thereof, the sliding bar (610) being coupled at a rear portion thereof to a distal end of the operation bar (510), the grip holder (600) comprising a pair of mounting bracket operation recesses (620 and 620') formed in opposite sides of a front portion thereof;
 a pair of pliers mounting brackets (700 and 700'), a rear portion of each of the pliers mounting brackets (700 and 700') being inserted into and pivotably mounted to a respective one of the mounting bracket operation recesses (620 and 620'), each of the pliers mounting brackets (700 and 700') comprising a pinion gear (710)

formed in a circumferential portion of the pivotably mounted rear portion thereof so as to be threadedly engaged with the rack gear (611), the pliers mounting brackets (700 and 700') being configured to be unfolded or folded by sliding movement of the cylinder rod (430); and pliers (1000) mounted to the pliers mounting brackets (700 and 700'), the pliers (1000) being configured to be unfolded and folded together with the pliers mounting brackets (700 and 700').

2. The manual hydraulic multi-functional extra-high-voltage insulating gear gripper pliers stick for live-wire work according to claim 1, wherein the pumping unit (200) comprises:

a body (210) connected to the oil tank (100);

a pressure chamber (220) formed in the body (210), the pressure chamber (220) accommodating a spring (222) elastically mounted therein and a piston (223) configured to be operated by an external hydraulic lever (221) in order to form hydraulic pressure;

a branch chamber (230) connected to the pressure chamber (220) via a connection flow path (231) in the body (210), the branch chamber (230) communicating with the oil outlet (110) of the oil tank (100), the branch chamber (230) comprising the first unfolding flow path (201) and the first folding flow path (202) formed in opposite sides thereof to be open toward a distal end of the body (210), the branch chamber (230) being connected to the pressure chamber (220) via a one-way check valve (232) configured to be closed when pressure is applied thereto and to be opened when pressure applied thereto is released; and a directional control valve (240) configured to slide by reciprocating through the body (210) and to penetrate middle portions of the first unfolding flow path (201) and the first folding flow path (202) to divide each of the first unfolding flow path (201) and the first folding flow path (202), the directional control valve (240) comprising a pair of first and second flow paths (241 and 242) formed in a circumferential portion thereof to be selectively connected to the first unfolding flow path (201) or the first folding flow path (202) and to the connection flow path (231) during sliding movement thereof in order to adjust connection directionality of the divided first unfolding flow path (201) or the divided first folding flow path (202) during sliding movement thereof.

3. The manual hydraulic multi-functional extra-high-voltage insulating gear gripper pliers stick for live-wire work according to claim 1, wherein the insulated extension stick (500) further comprises a handle safe-distance portion (520) formed on an outer circumferential portion thereof.

4. The manual hydraulic multi-functional extra-high-voltage insulating gear gripper pliers stick for live-wire work according to claim 1, wherein a valve chamber (311) is formed in the fixed block (300) to divide each of the second unfolding flow path (301) and the second folding flow path (302) into two parts comprising a rear part oriented toward the handle operation unit (10) and a front part oriented toward the gear gripper unit (20), and wherein a bidirectional check valve (310) is further included in the valve chamber (311) to connect the divided second unfolding flow path (301) or the divided second folding flow path (302) according to a direction in which hydraulic pressure is applied to the second unfolding flow path (301) or the second folding flow path (302).

5. The manual hydraulic multi-functional extra-high-voltage insulating gear gripper pliers stick for live-wire work according to claim 4, wherein the bidirectional check valve (310) comprises:

an unfolding valve unit (321) coupled to one side of the valve chamber (311), the unfolding valve unit (321) comprising an unfolding oil chamber (321*a*) formed therein to connect the divided second unfolding flow path (301) and an unfolding valve (322) formed in the unfolding oil chamber (321*a*) to allow or interrupt connection of the divided second unfolding flow path (301) through sliding movement thereof;

a folding valve unit (325) coupled to an opposite side of the valve chamber (311), the folding valve unit (325) comprising a folding oil chamber (325*a*) formed therein to connect the divided second folding flow path (302) and a folding valve (326) formed in the folding oil chamber (325*a*) to allow or interrupt connection of the divided second folding flow path (302) through sliding movement thereof; and a valve piston (328) formed between the unfolding valve unit (321) and the folding valve unit (325) in the valve chamber (311) to adjust an opening/closing amount of the unfolding valve (322) or the folding valve (326) according to a direction in which hydraulic pressure is applied to the second unfolding flow path (301) or the second folding flow path (302) through reciprocating movement thereof by hydraulic pressure.

6. The manual hydraulic multi-functional extra-high-voltage insulating gear gripper pliers stick for live-wire work according to claim 4, wherein the bidirectional check valve (310) comprises:

a pair of closing caps (331 and 331') configured to close opposite ends of the valve chamber (311);

a valve piston (335) configured to adjust an opening/closing amount of the second unfolding flow path (301) or the second folding flow path (302), divided into the front part and the rear part, according to a direction in which hydraulic pressure is applied to the second unfolding flow path (301) or the second folding flow path (302) through reciprocating movement thereof by hydraulic pressure in the valve chamber (311); and a pair of piston springs (339 and 339') elastically mounted between opposite ends of the valve piston (335) and the closing caps (331 and 331') to apply elastic force to the valve piston (335), and wherein the valve piston (335) comprises:

an unfolding flow path communication portion (336) having an inclined surface (336*a*) extending from one end of the valve piston (335) such that a diameter thereof gradually decreases and an unfolding flow path support protrusion (336*b*) formed at an end thereof so as to interfere with one (331) of the closing caps during operation of the valve piston (335) in order to form or interrupt connection between the second unfolding flow path (301) and the valve chamber (311); and a folding flow path communication portion (337) having an inclined surface (337*a*) extending from an opposite end of the valve piston (335) such that a diameter thereof gradually decreases and a folding flow path support protrusion (337*b*) formed at an end thereof so as to interfere with a remaining one (331') of the closing caps during operation of the valve piston (335) in order to form or interrupt connection between the second folding flow path (302) and the valve chamber (311).

7. The manual hydraulic multi-functional extra-high-voltage insulating gear gripper pliers stick for live-wire work according to claim 6, wherein a spherical-shaped ball-type unfolding flow path check valve (341) is further included in the front part of the second unfolding flow path (301), the unfolding flow path check valve (341) being elastically supported by a spring (342) mounted in the front part of the second unfolding flow path (301) so as to protrude into the valve chamber (311) and to block connection with the valve chamber (311),
wherein a spherical-shaped ball-type folding flow path check valve (351) is further included in the front part of the second folding flow path (302), the folding flow path check valve (351) being elastically supported by a spring (352) mounted in the front part of the second folding flow path (302) so as to protrude into the valve chamber (311) and to block connection with the valve chamber (311),
wherein a stepped protrusion (301a) is further formed on an end portion of the second unfolding flow path (301) that is adjacent to the valve chamber (311),
wherein a stepped protrusion (302a) is further formed on an end portion of the second folding flow path (302) that is adjacent to the valve chamber (311), and
wherein each of the unfolding flow path check valve (341) and the folding flow path check valve (351) is formed to have a diameter smaller than an inner diameter of a corresponding one of the second unfolding flow path (301) and the second folding flow path (302).

8. The manual hydraulic multi-functional extra-high-voltage insulating gear gripper pliers stick for live-wire work according to claim 1, wherein the cylinder unit (400) comprises:
a cylinder body (410) coupled to the fixed block (300), the cylinder body (410) comprising a piston chamber (411) formed therein so as to be open forwards, the third unfolding flow path (401) formed in one side of a rear portion thereof so as to connect the second unfolding flow path (301) to the piston chamber (411), and the third folding flow path (402) formed in a center of the rear portion thereof so as to connect the second folding flow path (302) to the piston chamber (411);
a guide pipe (420) coupled to a center of a rear end of the piston chamber (411) in the piston chamber (411), the guide pipe (420) comprising a through-hole (421) formed in a center thereof so as to communicate with the third folding flow path (402);
the cylinder rod (430) comprising a cylinder piston (431) formed at a rear end thereof so as to be accommodated in the piston chamber (411), a guide groove (432) formed in a rear portion thereof to allow the guide pipe (420) to be inserted thereinto and slide therein, and a flow path communication hole (433) formed in a circumferential portion thereof so as to communicate with the guide groove (432); and
a closing cap (440) configured to close a distal end of the cylinder body (410) and to allow the cylinder rod (430) to penetrate a center thereof, the closing cap (440) comprising an oil groove (441) formed in a rear end thereof, the oil groove (441) having a larger diameter than the cylinder rod (430) and communicating with the piston chamber (411) and the flow path communication hole (433).

9. The manual hydraulic multi-functional extra-high-voltage insulating gear gripper pliers stick for live-wire work according to claim 1, wherein the pliers (1000) comprise a pair of folding bars (1001 and 1001') configured to be unfolded or folded together with the pliers mounting brackets (700 and 700') by operation of the rack gear (611) and the pinion gear (710) during sliding movement of the cylinder rod (430).

10. The manual hydraulic multi-functional extra-high-voltage insulating gear gripper pliers stick for live-wire work according to claim 9, wherein the pliers (1000) are gripper pliers (1100) having gripping force when folded, the gripper pliers (1100) being configured such that gripping recesses (1110 and 1110') are formed with a gentle curvature in inner circumferential surfaces of the folding bars (1001 and 1001') in order to grip a wire, and at least one pair of wire-seating recesses (1111 and 1111') are formed at positions in the gripping recesses (1110 and 1110') that correspond to each other, and
wherein the gripper pliers (1100) are configured to be replaceably mounted to the pliers mounting brackets (700 and 700').

11. The manual hydraulic multi-functional extra-high-voltage insulating gear gripper pliers stick for live-wire work according to claim 9, wherein the pliers (1000) are snap pliers (1200) providing spreading force when unfolded, the snap pliers (1200) being configured such that spreading portions (1210) are formed at outer surfaces of tips of the folding bars (1001 and 1001') so as to be symmetrical with each other, and
wherein the folding bars (1001 and 1001') are configured to be replaceably mounted to the pliers mounting brackets (700 and 700').

12. The manual hydraulic multi-functional extra-high-voltage insulating gear gripper pliers stick for live-wire work according to claim 9, wherein the pliers (1000) are any one of nipper pliers (1300) having cutting force when folded and comprising cutting portions (1310) formed symmetrically at inner surfaces of tips of the folding bars (1001 and 1001'), long nose pliers (1400) having gripping force when folded and comprising pincer portions (1410) formed symmetrically at inner surfaces of tips of the folding bars (1001 and 1001'), and pin-gripping pliers (1500) having gripping force when folded and comprising semicircular-shaped pin-gripping recesses (1510) formed symmetrically in inner surfaces of tips of the folding bars (1001 and 1001'), and
wherein any one of the nipper pliers (1300), the long nose pliers (1400), and the pin-gripping pliers (1500) is configured to be mounted to the pliers mounting brackets (700 and 700').

* * * * *